United States Patent
Nishio et al.

(10) Patent No.: US 11,119,604 B2
(45) Date of Patent: Sep. 14, 2021

(54) DISPLAY DEVICE AND TOUCH SENSOR WITH ACCURATE TOUCH DETECTION AND LOW POWER CONSUMPTION

(71) Applicant: Sharp Kabushiki Kaisha, Sakai (JP)

(72) Inventors: Masaaki Nishio, Sakai (JP); Daiji Kitagawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 9 days.

(21) Appl. No.: 16/346,571

(22) PCT Filed: Nov. 2, 2017

(86) PCT No.: PCT/JP2017/039672
§ 371 (c)(1),
(2) Date: May 1, 2019

(87) PCT Pub. No.: WO2018/088315
PCT Pub. Date: May 17, 2018

(65) Prior Publication Data
US 2019/0265858 A1     Aug. 29, 2019

(30) Foreign Application Priority Data

Nov. 11, 2016     (JP) .............................. JP2016-220136

(51) Int. Cl.
*G06F 3/041* (2006.01)
*G09G 3/36* (2006.01)
(Continued)

(52) U.S. Cl.
CPC .......... *G06F 3/04166* (2019.05); *G02F 1/133* (2013.01); *G06F 3/0354* (2013.01);
(Continued)

(58) Field of Classification Search
CPC . G06F 3/04166; G09G 3/3674; G09G 3/3648
See application file for complete search history.

(56) References Cited

U.S. PATENT DOCUMENTS

| | | |
|---|---|---|
| 2002/0015016 A1 | 2/2002 | Kudo et al. |
| 2013/0009888 A1* | 1/2013 | Park ...................... G06F 3/0416 345/173 |

(Continued)

FOREIGN PATENT DOCUMENTS

| | | |
|---|---|---|
| JP | 2005-043914 A | 2/2005 |
| JP | 2008-015755 A | 1/2008 |

(Continued)

OTHER PUBLICATIONS

Official Communication issued in International Patent Application No. PCT/JP2017/039672, dated Jan. 30, 2018.

*Primary Examiner* — Carolyn R Edwards
*Assistant Examiner* — Andrew B Schnirel
(74) *Attorney, Agent, or Firm* — Keating & Bennett, LLP

(57) ABSTRACT

A display controller controls changing timing of a waveform of each of gate clock signals (GCK1, GCK2) so that a display driving operation is performed after the lapse of a relatively short time from a starting point of time of a horizontal scanning period in odd-numbered horizontal scanning periods (Ho), and that a display driving operation is performed after the lapse of a relatively long time from a starting point of time of a horizontal scanning period in even-numbered horizontal scanning periods (Ho). A touch panel controller outputs a pulse of a touch drive signal (STD) so that a position detection operation on a touch panel is started in a stable period after an end of the display driving operation in each of the odd-numbered horizontal scanning periods (Ho).

11 Claims, 18 Drawing Sheets

(51) Int. Cl.
    *G02F 1/133* (2006.01)
    *G06F 3/0354* (2013.01)
    *G09G 3/20* (2006.01)

(52) U.S. Cl.
    CPC ............ *G06F 3/041* (2013.01); *G09G 3/20* (2013.01); *G09G 3/36* (2013.01); *G09G 3/3648* (2013.01); *G09G 3/3674* (2013.01)

(56) References Cited

U.S. PATENT DOCUMENTS

| | | | |
|---|---|---|---|
| 2014/0062899 A1* | 3/2014 | Lee | G06F 3/044 345/173 |
| 2014/0320427 A1* | 10/2014 | Lee | G06F 3/044 345/173 |
| 2014/0347297 A1* | 11/2014 | Tsuji | G06F 3/044 345/173 |
| 2015/0022476 A1 | 1/2015 | Fujioka et al. | |
| 2015/0091865 A1 | 4/2015 | Funayama | |
| 2016/0085363 A1 | 3/2016 | Azumi et al. | |
| 2017/0228087 A1* | 8/2017 | Liu | G06F 3/0412 |
| 2018/0004329 A1* | 1/2018 | So | G02F 1/134309 |
| 2018/0059868 A1* | 3/2018 | Brahma | G06F 3/0418 |

FOREIGN PATENT DOCUMENTS

| | | |
|---|---|---|
| JP | 2015-072549 A | 4/2015 |
| JP | 2016-061934 A | 4/2016 |
| WO | 2013/129333 A1 | 9/2013 |

\* cited by examiner

Fig.14

|  |  | REGISTER SETTING GROUP A | REGISTER SETTING GROUP B |
|---|---|---|---|
| GCK | START | ...... | ...... |
|  | WIDTH | ...... | ...... |
| MUX | START | ...... | ...... |
|  | WIDTH | ...... | ...... |
|  | INTARVAL | ...... | ...... |
| Source | ChangingPoint1 | ...... | ...... |
|  | ChangingPoint2 | ...... | ...... |
|  | ChangingPoint3 | ...... | ...... |
|  | ChangingPoint4 | ...... | ...... |
|  | Level1 | ...... | ...... |
|  | Level2 | ...... | ...... |
| COM | ChangingPoint | ...... | ...... |
| ⋮ | ⋮ | ⋮ | ⋮ |

Fig.15

|  | ODD-NUMBERED FRAME | EVEN-NUMBERED FRAME |
|---|---|---|
| ODD-NUMBERED LINE | A | A |
| EVEN-NUMBERED LINE | B | B |

|  | ODD-NUMBERED FRAME | EVEN-NUMBERED FRAME |
|---|---|---|
| ODD-NUMBERED LINE | A | B |
| EVEN-NUMBERED LINE | B | A |

Fig.21

|  | FRAME | | | |
|---|---|---|---|---|
|  | N | N+1 | N+2 | N+3 |
| ODD-NUMBERED LINE | A | B | B | A |
| EVEN-NUMBERED LINE | B | A | A | B |

DISPLAY DEVICE AND TOUCH SENSOR WITH ACCURATE TOUCH DETECTION AND LOW POWER CONSUMPTION

TECHNICAL FIELD

The present invention relates to a display device with a touch sensor capable of detecting a touch position and to a method for driving the same.

BACKGROUND ART

In recent years, electronic instruments operable by touching screens thereof by a finger, a pen and the like have become widespread. For example, an electronic instrument provided with a touch panel has become significantly widespread. In a touch panel of an electrostatic capacitance system, a position (touch position) of a detection target such as a finger of a user (operator) and a pen (touch pen) is detected on the basis of a change of electrostatic capacitance. Such a touch panel of the electrostatic capacitance system is generally used integrally with a display device such as a liquid crystal display device.

Regarding the display device with the touch panel, a self-capacitance system and a mutual-capacitance system are known as a position detection system by the electrostatic capacitance system. The self-capacitance system is a system for determining a position of a detection target by sensing an increase of electrostatic capacitance, which is caused by contact or approach of the detection target with the touch panel. The mutual-capacitance system is a system for determining a position of a detection target on the basis of a difference in electrostatic capacitance between adjacent sensors, the difference being caused by contact or approach of the detection target with the touch panel. Note that a touch panel capable of detecting a position by using both of the self-capacitance system and the mutual-capacitance system is also developed.

Moreover, separately from the method using the touch panel, as a method for detecting a touch position, there is also known a method in which a plurality of optical sensors are provided on a display panel and the touch position is detected on the basis of coordinates of a portion shielded from light by touch operation (note that a display panel provided with such optical sensors is also called a "touch panel" in some cases.). A display device that adopts such a method using the optical sensors is called a "display device with optical sensors" or the like.

Hereinafter, in this description, a display device provided with a function to detect a touch position, such as a display device with a touch panel and a display device with optical sensors which are described above, will be referred to as a "display device with a touch sensor".

Incidentally, it has been heretofore known that the touch panel is prone to be affected by noise from the display device. Since a high-sensitivity touch panel of the electrostatic capacitance system is particularly prone to be affected by noise, when drive of the touch panel and drive of the display device interfere with each other, an unexpected malfunction is brought about. Moreover, when such an interference occurs, accuracy of the position detection also degrades. The display device with optical sensors is sometimes affected by noise caused by intensity of external light, and the like.

Accordingly, regarding the display device with a touch sensor, it is proposed to detect a touch position in a period during which noise is as small as possible. For example, in a display device disclosed in International Publication No. WO 2013/129333, a touch position is detected in a period other than a rising period of a source signal. Moreover, in Japanese Laid-Open Patent Publication No. 2015-72549, regarding a liquid crystal display device with a touch panel, it is proposed to dispose, in a stable period, either a rise or fall of a drive pulse for detecting a touch position. Moreover, in a display device disclosed in Japanese Laid-Open Patent Publication No. 2016-61934, a touch position is detected in an idle period during which a display operation is not performed.

PRIOR ART DOCUMENTS

Patent Documents

[Patent Document 1] International Publication No. WO 2013/129333
[Patent Document 2] Japanese Laid-Open Patent Publication No. 2015-72549
[Patent Document 3] Japanese Laid-Open Patent Publication No. 2016-61934

SUMMARY OF THE INVENTION

Problems to be Solved by the Invention

In the display device with a touch sensor, in order to reduce such an influence of noise, it is necessary to set a driving period for display and a driving period for detecting a touch position to different periods from each other. However, in recent years, a resolution of the display device has been increased significantly, and one horizontal scanning period has been shortened. Therefore, in order to sufficiently ensure a driving period for detecting a touch position, it is necessary to detect a touch position not for each output of display data for one line but for each output of display date for a plurality of lines. Therefore, in order to perform a display operation normally, there is required a storage area (storage area for storing display data) for absorbing a difference between an input frequency and output frequency of display data. For example, it is necessary to provide storage means (storage area) such as a RAM and a line buffer for several tens of lines in a drive LSI (display controller to be described later). As a result, a size of the drive LSI is increased, and current consumption is increased.

Accordingly, it is an object of the present invention to achieve a display device with a touch sensor, which is capable of accurately detecting a touch position while reducing current consumption more than heretofore. Moreover, it is another object of the present invention to achieve a display device with a touch sensor, which is capable of accurately detecting a touch position even when a smaller storage area than heretofore is used.

Means for Solving the Problems

A first aspect of the present invention is directed to a display device with a touch sensor, including:

a display device including a display unit configured to display an image, a display drive unit configured to perform a display driving operation for displaying the image on the display unit, and a display control unit configured to control timing of performing the display driving operation by the display drive unit; and a touch sensor including a sensor unit configured to perform a position detection operation for detecting a touched position, and a touch drive unit configured to drive the sensor unit so that the position detection operation is performed, wherein two continuous horizontal scanning periods in each frame period includes a first-type horizontal scanning period and a second-type horizontal scanning period, the display control unit controls an operation of the display drive unit so that, in the first-type horizontal scanning period, the display driving operation is performed after a lapse of a relatively short time from a starting point of time of a horizontal scanning period, and that, in the second-type horizontal scanning period, the display driving operation is performed after lapse of a relatively long time from a starting point of time of a horizontal scanning period, and the touch drive unit starts to drive the sensor unit after an end of the display driving operation by the display drive unit in the first-type horizontal scanning period.

According to a second aspect of the present invention, in the first aspect of the present invention, the display control unit includes a timing signal generation circuit configured to generate a timing signal group that controls the operation of the display drive unit, and changing timing of each waveform of the timing signal group generated by the timing signal generation circuit differs between the first-type horizontal scanning period and the second-type horizontal scanning period, the changing timing being timing when the starting point of time of the horizontal scanning period is taken as a reference.

According to a third aspect of the present invention, in the second aspect of the present invention, the display control unit further includes a register configured to hold information for determining the changing timing of each waveform of the timing signal group, and the timing signal generation circuit generates the timing signal group based on the information held in the register.

According to a fourth aspect of the present invention, in the second aspect of the present invention, the display unit includes a plurality of scanning signal lines, the display drive unit includes a scanning signal line drive circuit configured to drive the plurality of scanning signal lines, the timing signal generation circuit generates, as a signal included in the timing signal group and for turning a scanning signal line to a selected state, a first scanning control clock signal whose waveform changes at relatively early timing with the starting point of time of a horizontal scanning period as a reference, and a second scanning control clock signal whose waveform changes at relatively late timing with the starting point of time of a horizontal scanning period as a reference, and the scanning signal line drive circuit turns a scanning signal line to the selected state based on the first scanning control clock signal in the first-type horizontal scanning period, and turns a scanning signal line to the selected state based on the second scanning control clock signal in the second-type horizontal scanning period.

According to a fifth aspect of the present invention, in the first aspect of the present invention, the touch drive unit stops driving the sensor unit by a starting point of time of a display driving operation by the display drive unit in the second-type horizontal scanning period after starting to drive the sensor unit in the first-type horizontal scanning period.

According to a sixth aspect of the present invention, in the first aspect of the present invention, the touch drive unit stops driving the sensor unit after an end of a display driving operation by the display drive unit in the second-type horizontal scanning period after starting to drive the sensor unit in the first-type horizontal scanning period.

According to a seventh aspect of the present invention, in the first aspect of the present invention, the touch drive unit stops driving the sensor unit from an ending point of time of the display driving operation by the display drive unit in the next first-type horizontal scanning period to a starting point of time of the display driving operation by the display drive unit in the subsequent second-type horizontal scanning period after starting to drive the sensor unit.

According to an eighth aspect of the present invention, in the first aspect of the present invention, the display control unit gives a synchronization signal to the touch drive unit after an end of the display driving operation by the display drive unit in the first-type horizontal scanning period, and the touch drive unit starts to drive the sensor unit based on the synchronization signal.

According to a ninth aspect of the present invention, in the first aspect of the present invention, regarding any two continuous frame periods, a type of a first horizontal scanning period in a preceding frame period and a type of a first horizontal scanning period in a subsequent frame period differ from each other.

According to a tenth aspect of the present invention, in the first aspect of the present invention, regarding N frame periods which are continuous (N is an even number), a number of frame periods in which a first horizontal scanning period is the first-type horizontal scanning period and a number of frame periods in which a first horizontal scanning period is the second-type horizontal scanning period are equal to each other.

An eleventh aspect of the present invention is directed to a display device with a sensor, including:

a display unit configured to display an image;

a display drive unit configured to perform a display driving operation for displaying the image on the display unit;

a display control unit configured to control timing of performing the display driving operation by the display drive unit;

a sensor unit; and a sensor drive unit configured to drive the sensor unit, wherein two continuous horizontal scanning periods in each frame period includes a first-type horizontal scanning period and a second-type horizontal scanning period, the display control unit controls an operation of the display drive unit so that, in the first-type horizontal scanning period, the display driving operation is performed after a lapse of a relatively short time from a starting point of time of a horizontal scanning period, and that, in the second-type horizontal scanning period, the display driving operation is performed after lapse of a relatively long time from a starting point of time of a horizontal scanning period, and the sensor drive unit starts to drive the sensor unit after an end of the display driving operation by the display drive unit in the first-type horizontal scanning period.

A twelfth aspect of the present invention is directed to a method for driving a display device with a touch sensor, the display device with the touch sensor including: a display device including a display unit configured to display an image and a display drive unit configured to perform a display driving operation for displaying the image on the display unit; and a touch sensor including a sensor unit configured to perform a position detection operation for detecting a touched position, the method including:

a display control step of controlling timing of performing the display driving operation by the display drive unit; and a touch drive step of driving the sensor unit so that the position detection operation is performed, wherein two continuous horizontal scanning periods in each frame period includes a first-type horizontal scanning period and a second-type horizontal scanning period, in the display control step, an operation of the display drive unit is controlled so that, in the first-type horizontal scanning period, the display driving operation is performed after a lapse of a relatively short time from a starting point of time of a horizontal scanning period, and that, in the second-type horizontal scanning period, the display driving operation is performed after lapse of a relatively long time from a starting point of time of a horizontal scanning period, and in the touch driving step, the sensor unit is started to be driven after an end of the display driving operation by the display drive unit in the first-type horizontal scanning period.

Effects of the Invention

According to the first aspect of the present invention, in each of the first-type horizontal scanning periods, the display driving operation is performed after the lapse of a relatively short time from the starting point of time of the horizontal scanning period, and in each of the second-type horizontal scanning periods, the display driving operation is performed after the lapse of a relatively long time from the starting point of time of the horizontal scanning period. Therefore, a stable period (a period with small noise) with a relatively long length is generated every two horizontal scanning periods. Since the long stable period is ensured as described above, even when the length of one horizontal scanning period is shortened as a result of advancements of a resolution increase and a frame rate increase, it is possible to detect the touch position without being affected by noise. That is, the S/N ratio is increased more than heretofore, and the touch performance (detection performance for the touch position) is improved. Moreover, in a case of attempting to ensure a stable period with a certain length, an effective horizontal scanning period (period during which the display driving operation is performed) can be lengthened more than heretofore. Therefore, even when a storage area (storage area for storing display data) for absorbing a difference between an input frequency and output frequency of display data is reduced more than heretofore, the touch position can be detected accurately while the display operation is normally performed. Moreover, since the storage area can be reduced, it is possible to reduce current consumption and to miniaturize a chip size in comparison with the conventional case. As described above, a display device with a touch sensor, which is capable of accurately detecting the touch position while reducing the current consumption more than heretofore, is achieved. Moreover, a display device with a touch sensor, which is capable of accurately detecting the touch position even when a smaller storage area than heretofore is used, is achieved.

According to the second aspect of the present invention, the changing timing of the waveform of the timing signal group is differentiated between the first-type horizontal scanning periods and the second-type horizontal scanning periods, whereby it is possible to differentiate the timing of performing the display driving operation between the first-type horizontal scanning periods and the second-type horizontal scanning periods.

According to the third aspect of the present invention, it is possible to easily control the timing of performing the display driving operation in each horizontal scanning period by rewriting the information of the register.

According to the fourth aspect of the present invention, it is possible to differentiate the period during which the scanning signal line is in the selected state between the first-type horizontal scanning periods and the second-type horizontal scanning periods by differentiating the changing timing of the waveform of the scanning control clock signal between the first-type horizontal scanning periods and the second-type horizontal scanning periods.

According to the fifth aspect of the present invention, the same effect as that of the first aspect of the present invention can be obtained.

According to the sixth aspect of the present invention, the same effect as that of the first aspect of the present invention can be obtained.

According to the seventh aspect of the present invention, it is possible to surely perform both of the start and stop of the drive of the sensor unit in the stable period with small noise.

According to the eighth aspect of the present invention, it is possible to surely start to drive the sensor unit in the stable period with small noise.

According to the ninth aspect of the present invention, a deviation (deviation regarding the drive) between the frames is eliminated, and accordingly, an occurrence of operation abnormality regarding the display and the detection of the touch position is suppressed.

According to the tenth aspect of the present invention, the same effect as that of the ninth aspect of the present invention can be obtained.

According to the eleventh aspect of the present invention, a display device with a sensor, which is capable of accurately detecting the touch position while reducing the current consumption more than heretofore, is achieved. Moreover, a display device with a sensor, which is capable of accurately detecting the touch position even when a smaller storage area than heretofore is used, is achieved.

According to the twelfth aspect of the present invention, the same effect as the first aspect of the present invention can be exhibited in the method for driving the display device with a touch sensor.

BRIEF DESCRIPTION OF THE DRAWINGS

FIG. 14 is a diagram illustrating an example of timing setting information in the first embodiment.

FIG. 15 is a diagram for explaining reference register information in the first embodiment.

FIG. 20 is a diagram for explaining reference register information in a second embodiment of the present invention.

FIG. 21 is a diagram for explaining reference register information in a modification of the second embodiment.

MODES FOR CARRYING OUT THE INVENTION

Embodiments of the present invention will be described below with reference to the accompanying drawings.

1. First Embodiment

<1.1 Overall Configuration>

Figure 2:
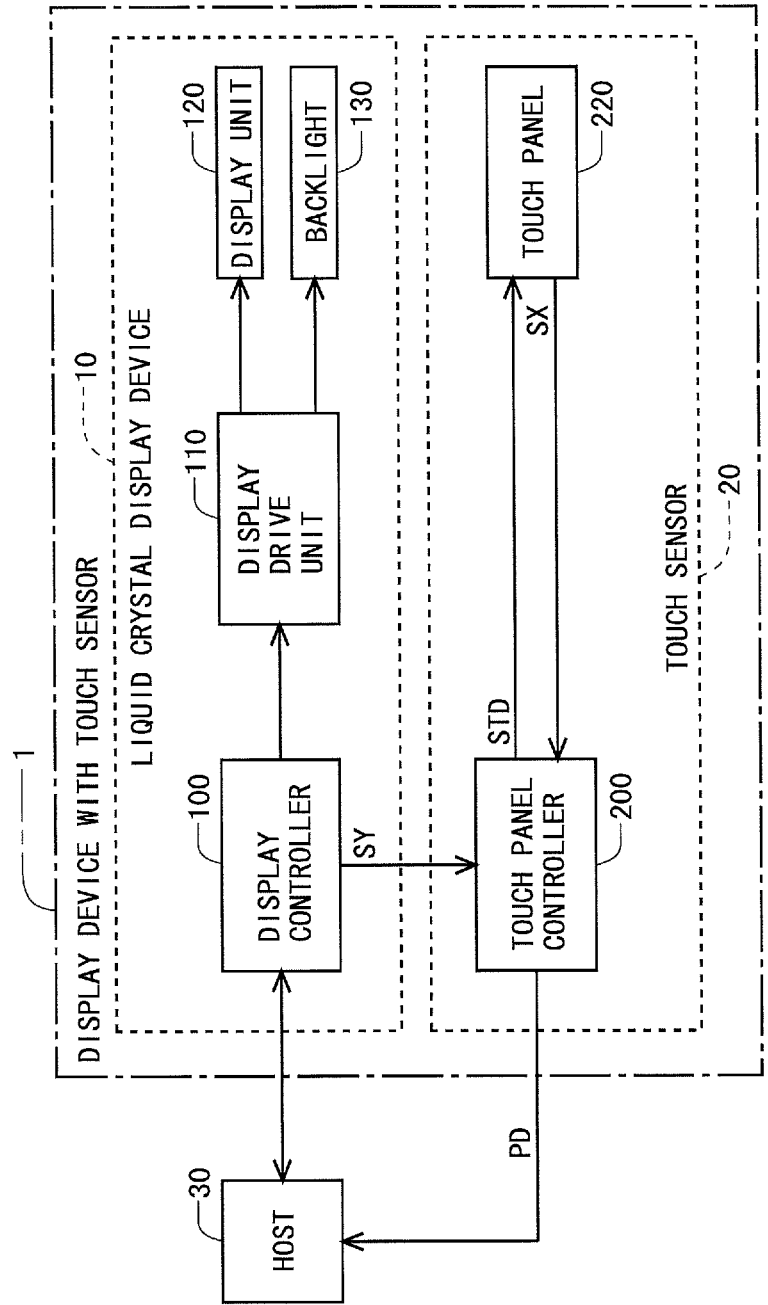
FIG. 2 is a block diagram illustrating a schematic configuration of the display device with a touch sensor according to the first embodiment.

FIG. 2 is a block diagram illustrating a schematic configuration of a display device with a touch sensor 1 according to a first embodiment of the present invention. This display device with a touch sensor 1 is constituted by a liquid crystal display device 10 and a touch sensor 20. This display device 1 with a touch sensor transmits and receives data to and from a host 30 (such as a personal computer). The liquid crystal display device 10 includes a display controller 100, a display drive unit 110, a display unit 120 and a backlight 130. The touch sensor 20 includes a touch panel controller 200 and a touch panel 220.

The touch panel controller 200 receives a synchronization signal SY transmitted from the display controller 100 in the liquid crystal display device 10, and outputs a touch drive signal STD for detection of a touch position to the touch panel 220. The touch panel 220 performs a position detection operation for the detection of the touch position (more specifically, detection of contact or approach of a detection target such as a touch pen and a finger of an operator of this display device with a touch sensor 1). Detection timing is determined on the basis of the touch drive signal STD outputted from the touch panel controller 200. A detection result of the touch position is sent as a sense signal SX from the touch panel 220 to the touch panel controller 200. Then, a position signal PD indicating the touch position is transmitted from the touch panel controller 200 to the host 30 on the basis of the sense signal SX. A detailed configuration of the liquid crystal display device 10 will be described later.

Note that, in this embodiment, a display control unit is realized by the display controller 100, a sensor unit is realized by the touch panel 220, and a touch drive unit is realized by the touch panel controller 200.

<1.2 Liquid Crystal Display Device>

<1.2.1 Overall Configuration of Liquid Crystal Display Device and Overview of Operations Thereof>

Figure 3:
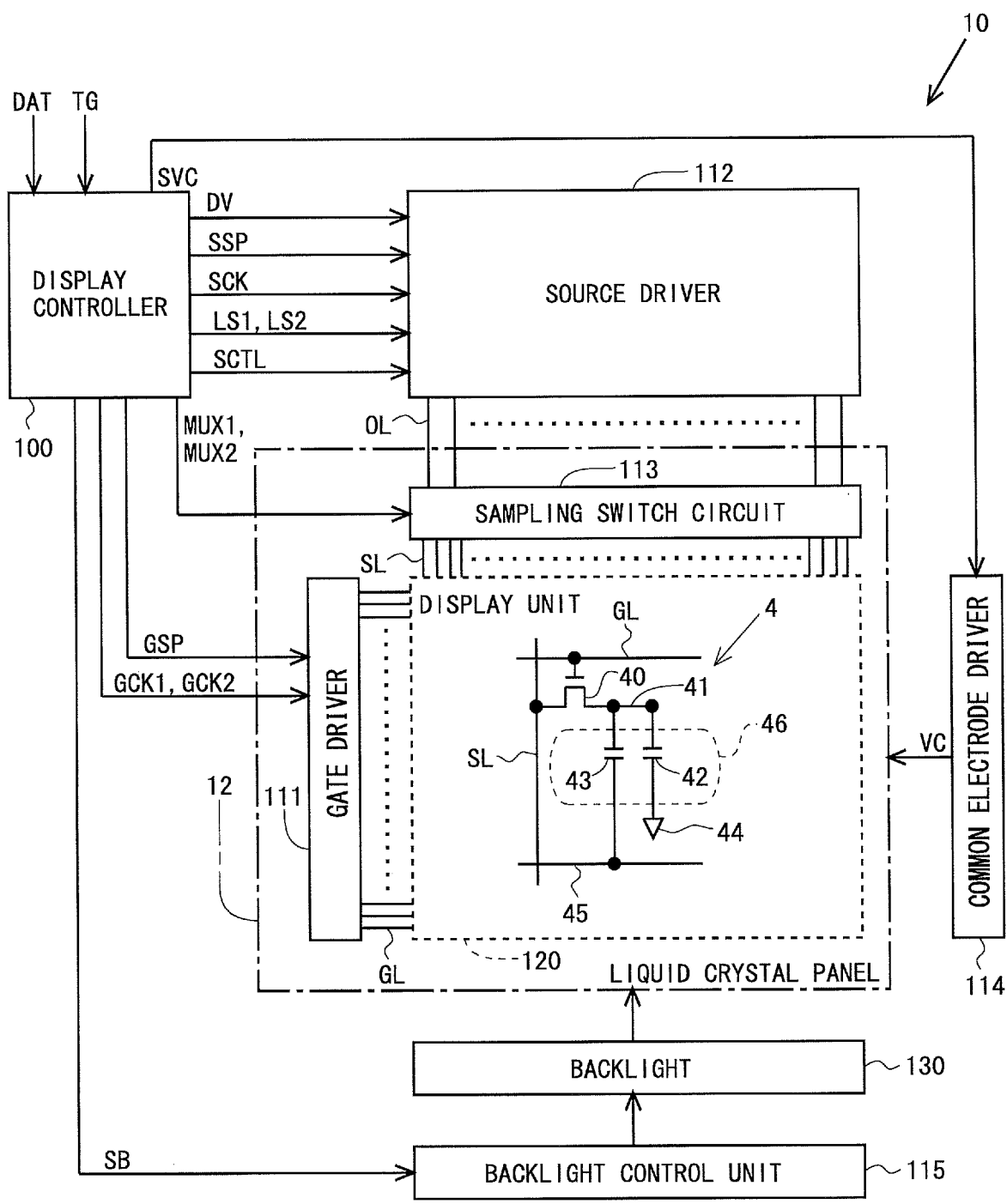
FIG. 3 is a block diagram illustrating a configuration of a liquid crystal display device in the first embodiment.

FIG. 3 is a block diagram illustrating a configuration of the liquid crystal display device 10. This liquid crystal display device 10 includes the display controller 100, a gate driver (scanning signal line drive circuit) 111, a source driver (video signal line drive circuit) 112, a sampling switch circuit 113, a common electrode driver 114, a backlight control unit 115, the display unit 120 and the backlight 130. The display unit 120 is provided in a liquid crystal panel 12 made of two glass substrates. Note that, as illustrated in FIG. 3, for example, the gate driver 111 and the sampling switch circuit 113 are provided in the liquid crystal panel 12. The gate driver 111 is sometimes provided in a form of an LSI on an outside of the liquid crystal panel 12 (typically, in a case where an amorphous silicon TFT is used). In this embodiment, the display drive unit 110 (see FIG. 2) is realized by the gate driver 111, the source driver 112, the sampling switch circuit 113, the common electrode driver 114 and the backlight control unit 115.

Regarding FIG. 3, a plurality of source bus lines (video signal lines) SL and a plurality of gate bus lines (scanning signal lines) GL are arranged in the display unit 120. Pixel formation portions 4 configured to form pixels are provided corresponding to respective intersections of the source bus lines SL and the gate bus lines GL. That is, the display unit 120 includes a plurality of pixel formation portions 4. The plurality of pixel formation portions 4 are arranged in a matrix form to constitute a pixel matrix of a plurality of rows×a plurality of columns. Each of the pixel formation portions 4 includes: a TFT 40 that is a switching element in which a gate terminal is connected to the gate bus line GL passing through a corresponding intersection and a source terminal is connected to the source bus line SL passing through the intersection; a pixel electrode 41 connected to a drain terminal of the TFT 40; a common electrode 44 and an auxiliary capacitance electrode 45 which are commonly provided to the plurality of pixel formation portions 4; liquid crystal capacitance 42 formed by the pixel electrode 41 and the common electrode 44; and auxiliary capacitance 43 formed by the pixel electrode 41 and the auxiliary capacitance electrode 45. The liquid crystal capacitance 42 and the auxiliary capacitance 43 constitute pixel capacitance 46. Note that, in the display unit 120 in FIG. 3, only components corresponding to one pixel formation portion 4 are illustrated.

A type of the TFT 40 in the display unit 120 is not particularly limited. For example, an amorphous silicon TFT, a low temperature poly silicon (LTPS)-TFT, an oxide TFT (TFT using an oxide semiconductor for a channel layer) or the like can be adopted as the TFT 40 in the display unit 120. As the oxide TFT, for example, there can be adopted a TFT in which a channel layer is formed by indium gallium zinc oxide (In—Ga—Zn—O) that is an oxide semiconductor containing indium (In), gallium (Ga), zinc (Zn) and oxygen (O) as main components.

The display controller 100 receives image data DAT and a timing signal group TG such as a horizontal synchronization signal, a vertical synchronization signal and the like, which are sent from the host 30, and outputs: a digital video signal DV; a gate start pulse signal GSP, a first gate clock signal GCK1 and a second gate clock signal GCK2, which are for controlling operations of the gate driver 111; a source start pulse signal SSP, a source clock signal SCK, a first latch strobe signal LS1, a second latch strobe signal LS2, and a source output control signal SCTL, which are for controlling operations of the source driver 112; a first time division control signal MUX1 and a second time division control signal MUX2 for controlling operations of the sampling switch circuit 113; a common electrode driving signal SVC for controlling operations of the common electrode driver 114; and a backlight control signal SB for controlling operations of the backlight control unit 115. Note that, as mentioned above, the display controller 100 also outputs the synchronization signal SY to the touch panel controller 200 (see FIG. 2).

The gate driver 111 repeats application of an active scanning signal to each of the gate bus lines GL with one vertical scanning period as a cycle on the basis of the gate start pulse signal GSP, the first gate clock signal GCK1 and the second gate clock signal GCK2, which are sent from the display controller 100.

The source driver 112 receives the digital video signal DV, the source start pulse signal SSP, the source clock signal SCK, the first latch strobe signal LS1, the second latch strobe signal LS2, and the source output control signal SCTL, which are sent from the display controller 100, and applies a driving video signal to each of output signal lines OL. At this time, in the source driver 112, digital video signals DV indicating voltages to be applied to the respective output signal lines OL are sequentially held at timing when pulses of the source clock signal SCK are generated. Then, the held digital video signals DV are converted into analog voltages on the basis of the first latch strobe signal LS1 and the second latch strobe signal LS2. The analog voltages thus converted are simultaneously applied as driving video signals to all the output signal lines OL.

The sampling switch circuit 113 receives the first time division control signal MUX1 and the second time division control signal MUX2, which are sent from the display controller 100, and applies the driving video signals, which are outputted from the source driver 112, to the source bus lines SL in a time division manner. In this embodiment, the number of source bus lines SL is twice the number of output signal lines OL. That is, the driving video signal outputted to one output signal line OL is applied to two source bus lines SL in the time division manner. In this manner, in this embodiment, time division driving also called source shared driving (SSD) is adopted. Note that the present invention can also be applied to a case where the time division driving is not adopted.

The common electrode driver 114 applies a predetermined voltage VC to the common electrodes 44 on the basis of the common electrode driving signal SVC sent from the display controller 100. Note that a polarity of the voltage VC is reversed every horizontal scanning period in this embodiment. The backlight control unit 115 controls a luminance of a light source (for example, an LED), which constitutes the backlight 130, on the basis of the backlight control signal SB sent from the display controller 100.

As described above, the driving video signals are applied to the source bus lines SL, the scanning signals are applied to the gate bus lines GL, the predetermined voltage VC is applied to common electrode 44, and the luminance of the light source that constitutes the backlight 130 is controlled, whereby an image that is based on the image data DAT is displayed on the display unit 120.

<1.2.2 Gate Driver>

Figure 4:
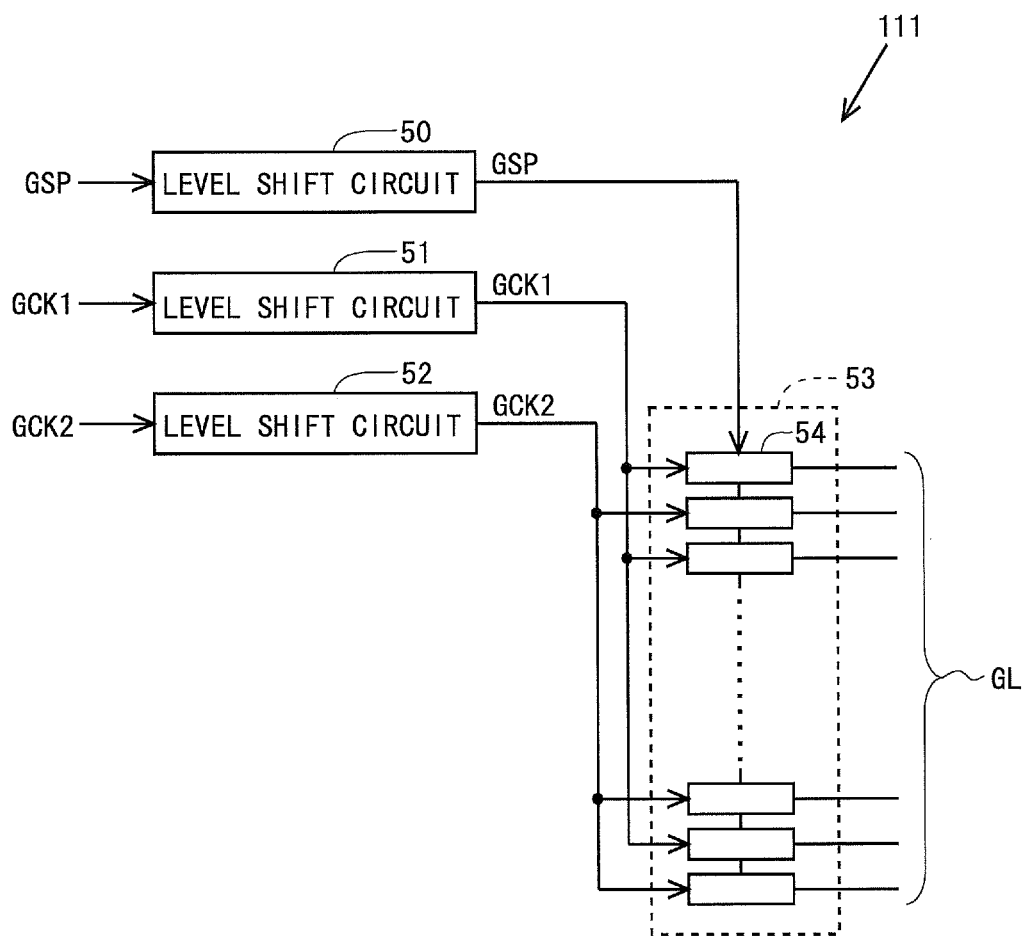
FIG. 4 is a block diagram illustrating a detailed configuration of a gate driver in the first embodiment.

FIG. 4 is a block diagram illustrating a detailed configuration of the gate driver 111. As illustrated in FIG. 4, the gate driver 111 includes level shift circuits 50 to 52 and a shift register 53 composed of a plurality of stages.

A logic level for use in the display controller 100 and a logic level for use in the shift register 53 in the gate driver 111 are different from each other. Therefore, the level shift circuits 50 to 52 which convert voltage levels of the signals outputted from the display controller 100 are provided. The level shift circuits 50, 51 and 52 respectively convert the voltage levels of the gate start pulse signal GSP, the first gate clock signal GCK1 and the second gate clock signal GCK2, which are outputted from the display controller 100. Then, signals subjected to the conversions of the voltage levels are given to the shift register 53.

The shift register 53 includes unit circuits 54 each constitutes a stage. Each unit circuit 54 is connected to a corresponding gate bus line GL. The first gate clock signal GCK1 is given to the unit circuits 54 at odd-numbered stages, and the second gate clock signal GCK2 is given to the unit circuits 54 at even-numbered stages.

In such a configuration as described above, when a pulse of the gate start pulse signal GSP (hereinafter, this pulse will be referred to as a "start pulse") is given to the unit circuit 54 at the first stage of the shift register 53, the start pulse is sequentially transferred from the unit circuit 54 at the first stage to the unit circuit 54 at a final stage on the basis of the above-mentioned first gate clock signal GCK1 and second gate clock signal GCK2. Then, in response to this transfer of the start pulse, the scanning signals outputted from the plurality of unit circuits 54 which constitute the shift register 53 sequentially turn to a high level (become active). As a result, the plurality of gate bus lines GL in the display unit 120 sequentially turn to a selected state every horizontal scanning period.

Note that, in this embodiment, a first scanning control clock signal is realized by the first gate clock signal GCK1, and a second scanning control clock signal is realized by the second gate clock signal GCK2. Moreover, although gate clock signals having two phases (that is, the first gate clock signal GCK1 and the second gate clock signal GCK2) are used in this embodiment, gate clock signals having phases (four phases, eight phases and the like) other than two phases can also be used.

<1.2.3 Source Driver>

Figure 5:
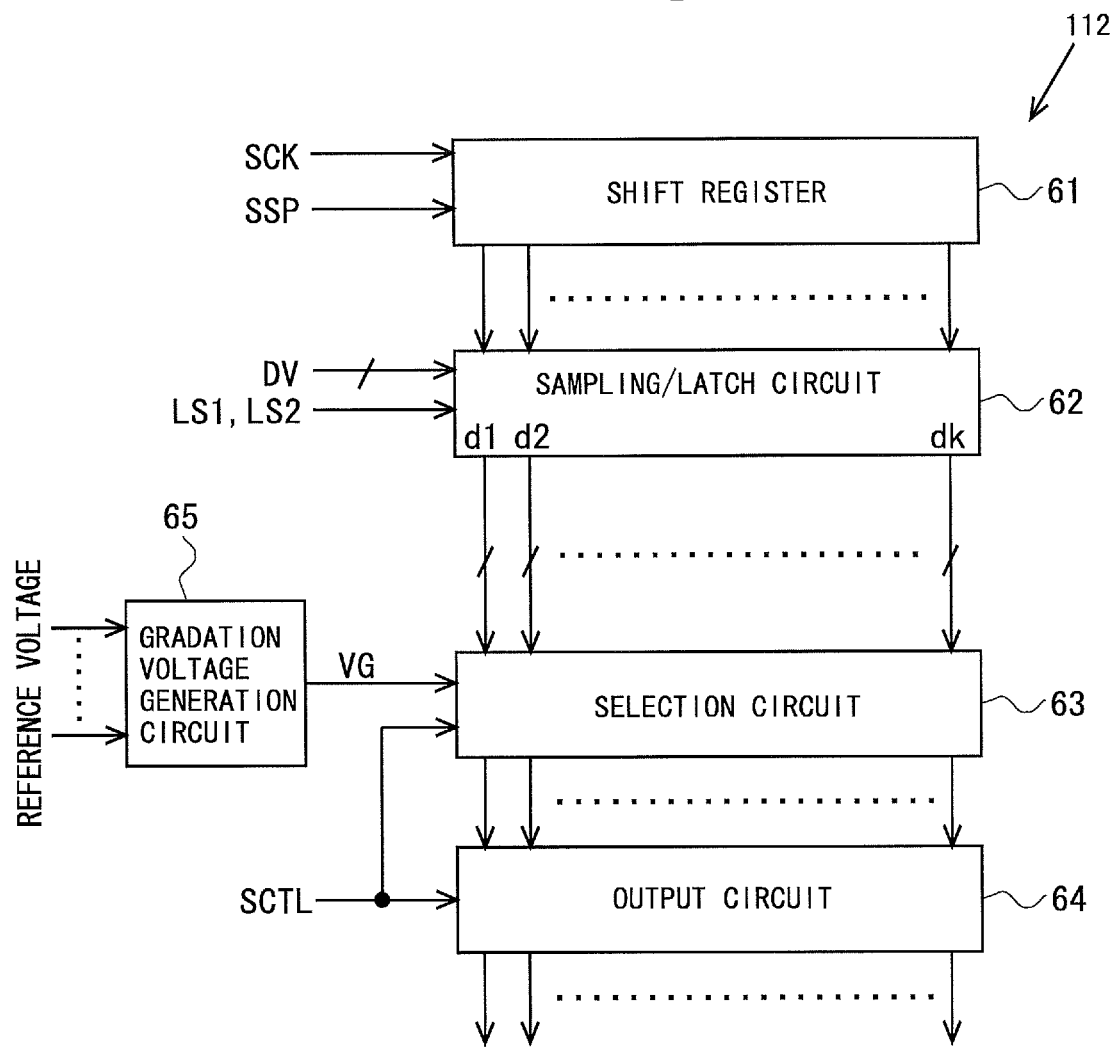
FIG. 5 is a block diagram illustrating a detailed configuration of a source driver in the first embodiment.

FIG. 5 is a block diagram illustrating a detailed configuration of the source driver 112. Note that it is assumed here that the number of output signal lines OL is k. This source driver 112 includes: a k-stage shift register 61; a sampling and latch circuit 62 that outputs, to k pieces of the output signal lines OL, corresponding internal video signals d1 to dk; a selection circuit 63 configured to select voltages to be applied to the respective output signal lines OL; an output circuit 64 configured to apply the voltages selected by the selection circuit 63 as the driving video signals to the respective output signal lines OL; and a gradation voltage generation circuit 65 configured to generate and output gradation voltages VG, for example, respectively corresponding to 256 gradation levels in the positive polarity and the negative polarity. Note that the number of gradation levels is not limited to 256, and for example, may be 64, 512, 1024 and the like.

The source start pulse signal SSP and the source clock signal SCK are inputted to the shift register 61. The shift register 61 transfers a pulse included in the source start pulse signal SSP sequentially from an input end to an output end on the basis of the source clock signal SCK. In response to this pulse transfer, sampling pulses corresponding to the respective output signal lines OL are sequentially outputted from the shift register 61, and the sampling pulses are sequentially inputted to the sampling and latch circuit 62.

The sampling and latch circuit 62 samples the digital video signals DV outputted from the display controller 100 at timing of the sampling pulses outputted from the shift register 61, and holds the sampled digital video signals DV in a sampling memory. In this embodiment, the sampling and latch circuit 62 is provided with two hold memories (first hold memory and second hold memory) as will be described later. Then, the digital video signals DV held in the sampling memory are simultaneously transferred to the first hold memory at timing of the pulse of the first latch strobe signal LS1. Moreover, the digital video signals DV held in the first hold memory are transferred to the second hold memory at timing of the pulse of the second latch strobe signal LS2. The sampling and latch circuit 62 simultaneously outputs, as the internal video signals d1 to dk, the digital video signals DV transferred to the second hold memory.

The gradation voltage generation circuit 65 generates the above-mentioned gradation voltages VG based on a plurality of reference voltages given from a predetermined power supply circuit (not illustrated), and outputs the generated gradation voltages VG. On the basis of the internal video signals d1 to dk outputted from the sampling and latch circuit 62, the selection circuit 63 selects one of a plurality of the gradation voltages outputted from the gradation voltage generation circuit 65, and outputs the selected gradation voltage. The gradation voltage outputted from the selection circuit 63 is inputted to the output circuit 64. The output circuit 64 performs impedance conversion for the gradation voltages outputted from the selection circuit 63, for example, by a voltage follower, and outputs the converted gradation voltages as driving video signals to the output signal lines OL. Note that the voltage outputted from the output circuit 64 to the output signal line OL is also changed as will be described later by the source output control signal SCTL given from the display controller 100 to the selection circuit 63 and the output circuit 64.

<1.2.4 Sampling Switch Circuit>

Figure 6:
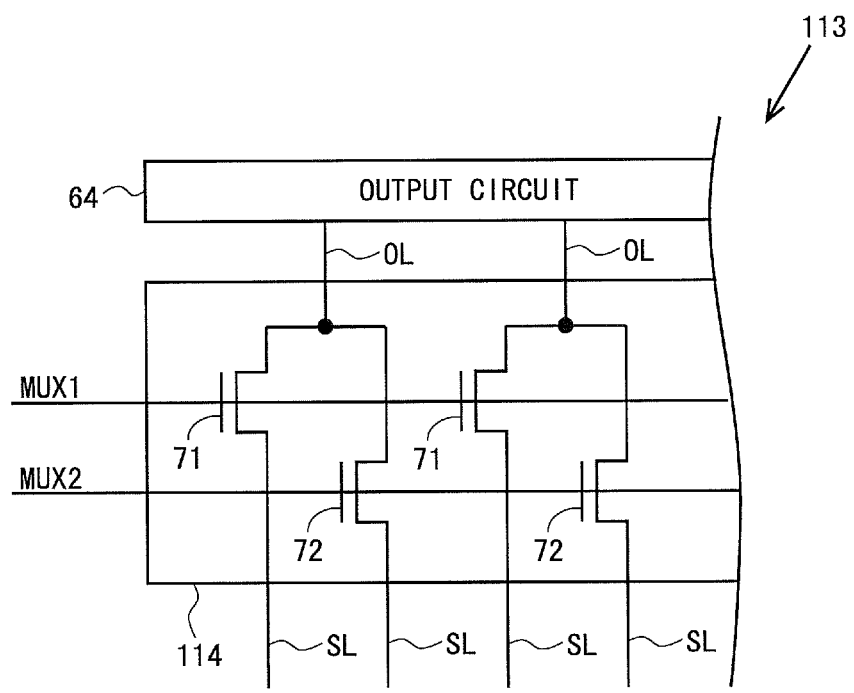
FIG. 6 is a circuit diagram illustrating a configuration of a sampling switch circuit in the first embodiment.

FIG. 6 is a circuit diagram illustrating a configuration of the sampling switch circuit 113. As illustrated in FIG. 6, in this embodiment, two source bus lines SL are associated with one output signal line OL. Between each of the odd-numbered source bus lines SL and each of the output signal lines OL, a sampling TFT 71 whose ON/OFF state is controlled by the first time division control signal MUX1 is provided, and between each of the even-numbered source bus lines SL and each of the output signal line OL, a sampling TFT 72 whose ON/OFF state is controlled by the second time division control signal MUX2. Note that, although a case in which NMOS thin film transistors are adopted as the sampling TFTs 71 and 72 is taken as an example here, PMOS thin film transistors and CMOS thin film transistors can also be adopted.

When the first time division control signal MUX1 is at the high level, the sampling TFT 71 in an ON state. Accordingly, the driving video signal outputted from the output circuit 64 to the output signal line OL is applied to the odd-numbered source bus line SL. When the second time division control signal MUX2 is at the high level, the sampling TFT 72 is in an ON state. Accordingly, the driving video signal outputted from the output circuit 64 to the output signal line OL is applied to the even-numbered source bus line SL. Note that, although the first time division control signal MUX1 and the second time division control signal MUX2 are never at the high level at the same time in the example illustrated in FIG. 1 and the like, a period during which both of the first time division control signal MUX1 and the second time division control signal MUX2 are at the high level may be provided in order to perform precharge by sharing charges between two source bus lines SL, for example.

<1.2.5 Display Controller>

Figure 7:
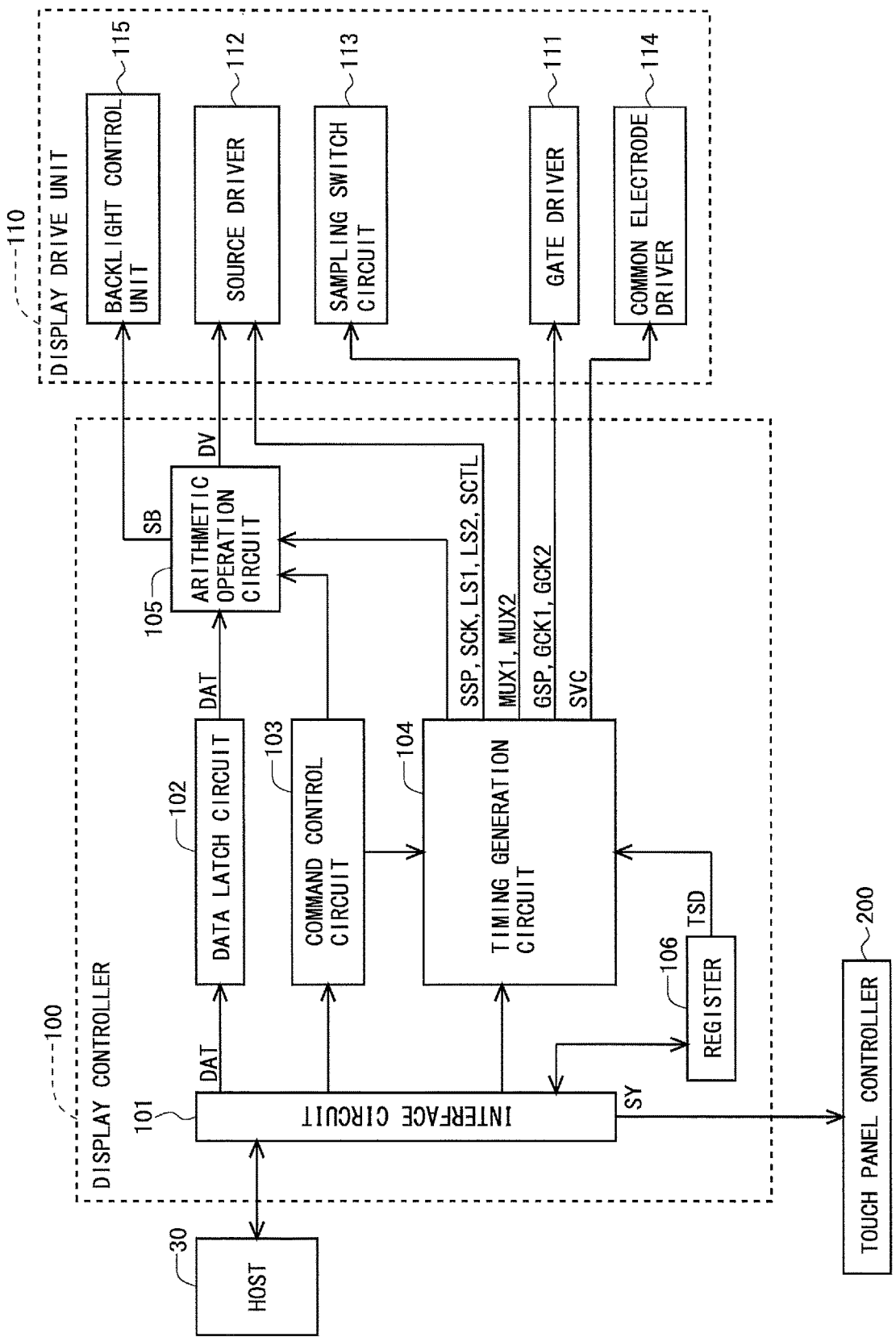
FIG. 7 is a block diagram illustrating a detailed configuration of a display controller in the first embodiment.

FIG. 7 is a block diagram illustrating a detailed configuration of the display controller 100. The display controller 100 includes an interface circuit 101, a data latch circuit 102, a command control circuit 103, a timing generation circuit 104, an arithmetic operation circuit 105 and a register 106. Note that circuits other than the above (that is, a power supply generation circuit, an oscillation circuit and the like) are sometimes provided in the display controller 100. Moreover, although a case in which the display controller 100 is a RAM-less LSI (a large-scale integrated circuit that does not include a RAM) is taken as an example here, the present invention can also be applied to a case where the display controller 100 has a RAM (The configuration may be such that a later-described driving method is achieved not by adding the hold memory from the conventional configuration but by using the RAM).

The interface circuit 101 has a function to transmit and receive data to and from the host 30. For example, the interface circuit 101 gives the data latch circuit 102 the image data DAT sent from the host 30, and gives the command control circuit 103 and the timing generation circuit 104 the timing signal group and a variety of commands which are sent from the host 30. Moreover, the interface circuit 101 gives the host 30 a content of the register 106 and various pieces of error information. Further, in this embodiment, the interface circuit 101 gives the touch panel controller 200 the synchronization signal SY so that the touch position is detected during a stable period with less noise.

The data latch circuit 102 latches, at appropriate timing, the image data DAT given from the host 30 via the interface circuit 101. The latched image data DAT is given to the arithmetic operation circuit 105. The command control circuit 103 controls operations of the timing generation circuit 104 and the arithmetic operation circuit 105 on the basis of the variety of command given from the host 30 via the interface circuit 101. The register 106 holds information (hereinafter referred to as "timing setting information") TSD for determining changing timing of each waveform of a variety of timing signals generated in the timing generation circuit 104.

On the basis of the timing signal group given from the host 30 via the interface circuit 101 and of the control by the command control circuit 103, the timing generation circuit 104 generates the variety of timing signals (the source start pulse signal SSP, the source clock signal SCK, the first latch strobe signal LS1, the second latch strobe signal LS2, the source output control signal SCTL, the first time division control signal MUX1, the second time division control signal MUX2, the gate start pulse signal GSP, the first gate clock signal GCK1, the second gate clock signal GCK2, and the common electrode driving signal SVC), and then outputs these timing signals. Note that the timing generation circuit 104 refers to the timing setting information TSD held in the register 106 at a time of generating the variety of timing signals.

The arithmetic operation circuit 105 receives the image data DAT outputted from the data latch circuit 102, and performs various pieces of arithmetic operation processing on the basis of the control by the command control circuit 103 and the timing generation circuit 104. Note that the arithmetic operation processing performed in this arithmetic operation circuit 105 is not particularly limited. As examples of the arithmetic operation processing, there are mentioned: processing for changing a hue and tint of a display image appropriately; processing for adjusting a contrast in order to improve visibility under daylight; processing for controlling the luminance of the backlight in consideration of a content of data on the entire screen; and the like. On the basis of results of the arithmetic operation processing as described above, the arithmetic operation circuit 105 outputs the digital video signal DV to the source driver 112, and outputs the backlight control signal SB to the backlight control unit 115.

<1.3 Regarding Configuration of Touch Panel and Drive for Detecting Touch Position>

Next, while referring to FIG. 8 to FIG. 10, a description will be given of a configuration of the touch panel 220 and drive for detecting the touch position. Note that, in this embodiment, it is assumed that an on-cell-type touch panel is adopted, and that position detection according to the self-capacitance system is performed. However, the present invention is not limited to this.

Figure 8:
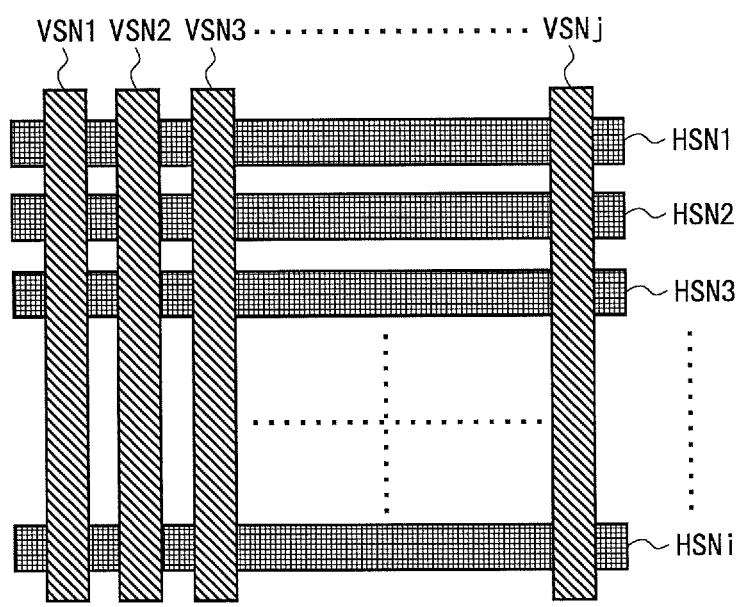
FIG. 8 is a view illustrating a configuration of a touch panel in the first embodiment.

As illustrated in FIG. 8, in the touch panel 220, as an electrode group for detecting the touch position, a plurality (i pieces) of horizontal sensor electrodes HSN1 to HSNi and a plurality (j pieces) of vertical sensor electrodes VSN1 to VSNj are arranged so as to intersect each other. The plurality of horizontal sensor electrodes HSN1 to HSNi and the plurality of vertical sensor electrodes VSN1 to VSNj are connected to the touch panel controller 200 (see FIG. 2).

Figure 9:
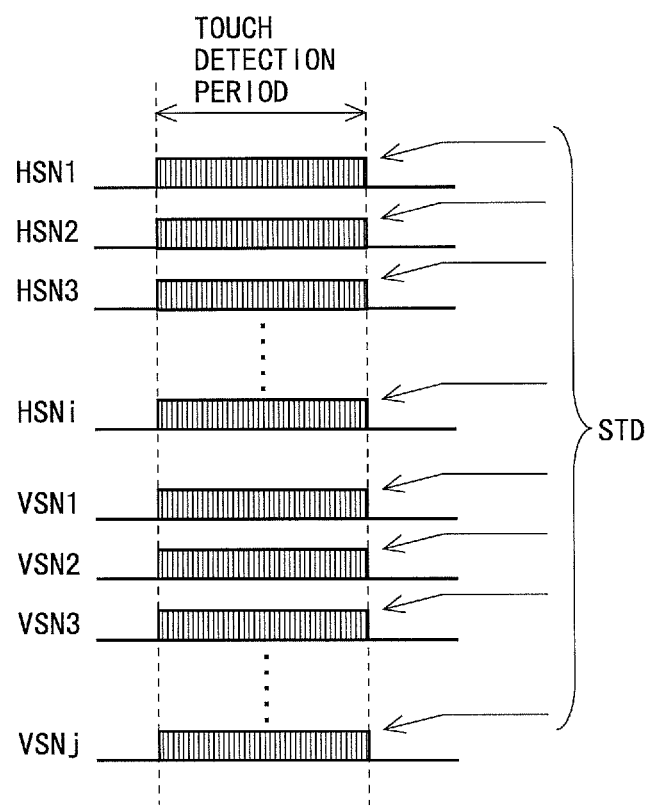
FIG. 9 is a timing chart for explaining drive for detection of a touch position in the first embodiment.
Figure 10:
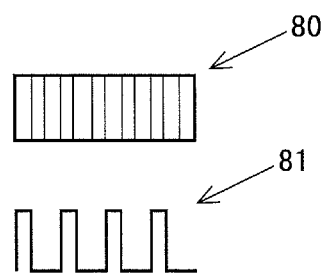
FIG. 10 is a diagram for explaining a touch drive signal in the first embodiment.

In such a configuration, in a touch detection period (driving period for detecting the touch position), as illustrated in FIG. 9, all the horizontal sensor electrodes HSN1 to HSNi and all the vertical sensor electrodes VSN1 to VSNj are simultaneously driven on the basis of the touch drive signal STD. As a result, in the touch panel controller 200, an increase of electrostatic capacitance in a horizontal sensor electrode and a vertical sensor electrode which correspond to the touch position is sensed, and the touch position is specified. Note that, regarding FIG. 9, a waveform having a vertical stripe pattern (that is, a waveform denoted by reference numeral 80 in FIG. 10) may be a waveform including a plurality of pulses (the number of pulses is not particularly limited) as denoted by reference numeral 81 in FIG. 10.

<1.4 Driving Method>

Figure 1:
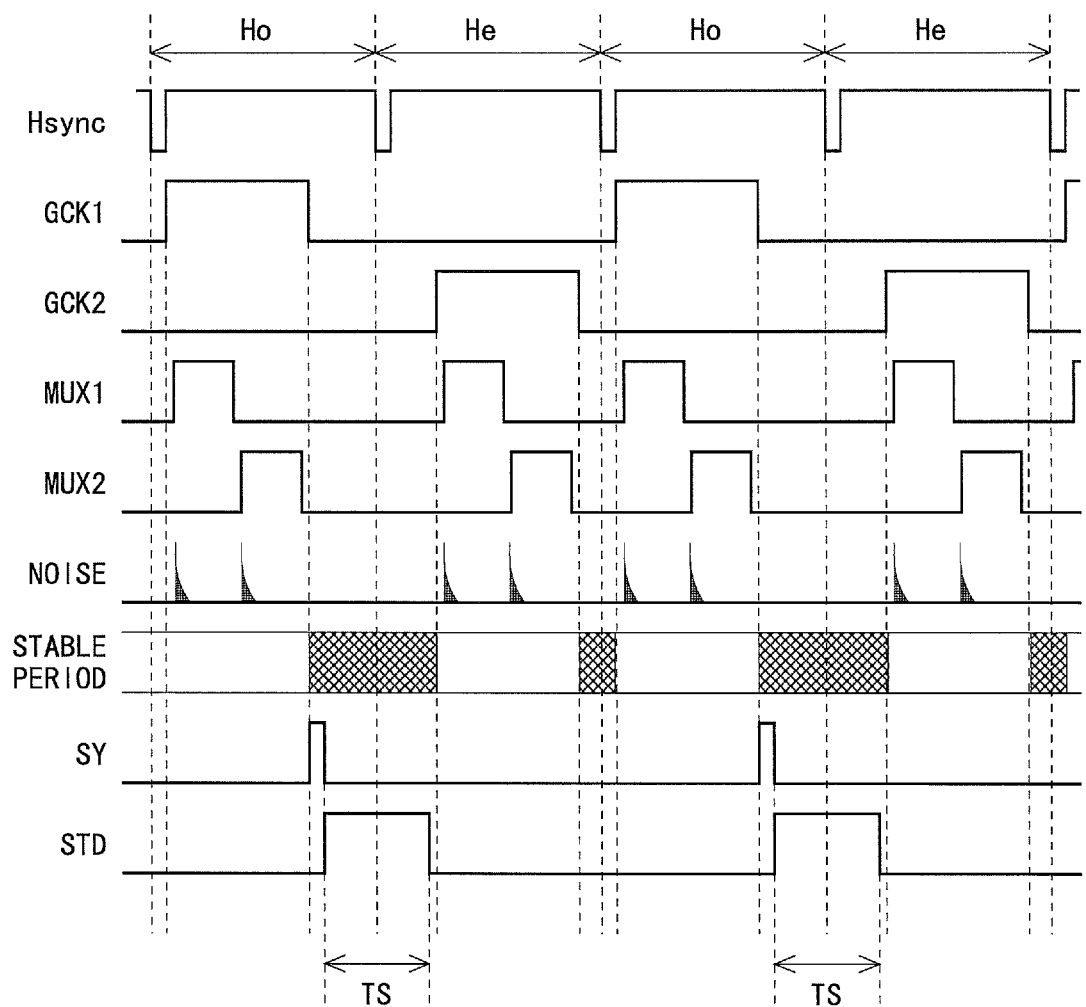
FIG. 1 is a timing chart for explaining a method for driving a display device with a touch sensor in a first embodiment of the present invention.

FIG. 1 is a timing chart for explaining a method for driving the display device with a touch sensor 1 according to this embodiment. As grasped from FIG. 1, in this embodiment, start/end timing of an effective horizontal scanning period in each horizontal scanning period differs between odd-numbered horizontal scanning periods Ho and even-numbered horizontal scanning periods He. Note that, here, a period during which the first gate clock signal GCK1 or the second gate clock signal GCK2 is at the high level is the effective horizontal scanning period. Moreover, a falling point of time of a horizontal synchronization signal Hsync included in the timing signal group sent from the host 30 is a starting point of time of the horizontal scanning period. In this embodiment, in each of the odd-numbered horizontal scanning periods Ho, the effective horizontal scanning period starts after the lapse of a relatively short time from the starting point of time of the horizontal scanning period, and in each of the even-numbered horizontal scanning periods He, the effective horizontal scanning period starts after the lapse of a relatively long time from the starting point of time of the horizontal scanning period. In other words, in each of the odd-numbered horizontal scanning periods Ho, a display driving operation is performed after the lapse of a relatively short time from the starting point of time of the horizontal scanning period, and in each of the even-numbered horizontal scanning period He, the display driving operation is performed after the lapse of a relatively long time from the starting point of time of the horizontal scanning period. Note that, in this embodiment, each of the odd-numbered horizontal scanning periods Ho corresponds to the first-type horizontal scanning period, and each of the even-numbered horizontal scanning periods He corresponds to the second-type horizontal scanning period. Moreover, although a pulse width of the first gate clock signal GCK1 and the second gate clock signal GCK2 has a length a little smaller than one horizontal scanning period in this embodiment, the pulse width of these may have, for example, a length a little smaller than two horizontal scanning periods or a length a little smaller than four horizontal scanning periods.

During the effective horizontal scanning period, the first time division control signal MUX1 and the second time division control signal MUX2 sequentially become the high level. Thereby, in a period during which the first time division control signal MUX1 is at the high level, the driving video signals are applied to the odd-numbered source bus lines SL, and in a period during which the second time division control signal MUX2 is at the high level, the driving video signals are applied to the even-numbered source bus lines SL. Here, as illustrated in FIG. 1, noise is prone to occur at timing when the application of the driving video signal to the each of source bus lines SL is started (timing when the first time division control signal MUX1 or the second time division control signal MUX2 changes from a low level to the high level).

In FIG. 1, stable periods with less noise are shown by shading. As grasped from FIG. 1, a period from a falling point of time of one gate clock signal to a rising point of time of other gate clock signal is the stable period. As mentioned above, in each of the odd-numbered horizontal scanning periods Ho, the effective horizontal scanning period starts after the lapse of a relatively short time from the starting point of time of the horizontal scanning period, and in each of the even-numbered horizontal scanning periods He, the effective horizontal scanning period starts after the lapse of a relatively long time from the starting point of time of the horizontal scanning period. Therefore, while a stable period crossing from the odd-numbered horizontal scanning period Ho to the even-numbered horizontal scanning period He is a relatively long period, a stable period crossing from the even-numbered horizontal scanning period He to the odd-numbered horizontal scanning period Ho is a relatively short period. Then, the touch position is detected in the stable period crossing from the odd-numbered horizontal scanning period Ho to the even-numbered horizontal scanning period He.

In order to achieve the above, the display controller 100 outputs a pulse as the synchronization signal SY to be given to the touch panel controller 200 at the falling point of time of the first gate clock signal GCK1. Then, on the basis of the pulse, the touch panel controller 200 sets the touch drive signal STD to the high level during a predetermined period TS (Note that, as mentioned above, a plurality of pulses may be outputted as the touch drive signal STD). More specifically, the touch panel controller 200 raises the touch drive signal STD (starts to drive the touch panel 220) after an end of the display driving operation by the display drive unit 110 in the odd-numbered horizontal scanning period Ho, and falls the touch drive signal STD (stops driving the touch panel 220) by a starting point of time of the display driving operation by the display drive unit 110 in the even-numbered horizontal scanning period He. As a result, the touch position is detecting in such a relatively long stable period.

Note that, as grasped from FIG. 1, in this embodiment, the touch position is not detected every horizontal scanning period, but the touch position is detected every two horizontal scanning periods.

Figure 11:
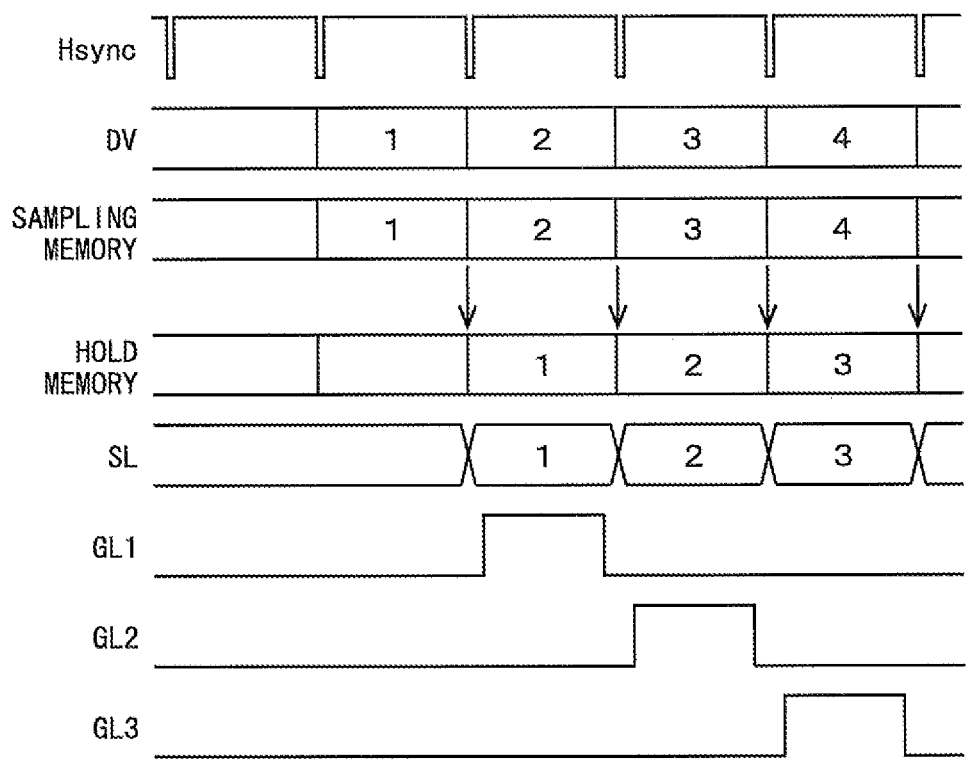
FIG. 11 is a diagram for explaining a flow of data (data for displaying an image) in a conventional liquid crystal display device using a RAM-less display controller.

Here, regarding a flow of data (data for displaying an image), a difference between the conventional case and this embodiment will be described. FIG. 11 is a diagram for explaining a flow of data in a conventional liquid crystal display device using a RAM-less display controller. Regarding the illustration of FIG. 11, for example, third-row data is represented by "3" (the same also applies to FIG. 12). Data (digital video signal) of each row, which is sent to the source driver, is captured into the sampling memory on the basis of the sampling pulse. After data for one line is captured into the sampling memory, data held in the sampling memory is simultaneously transferred to the hold memory. Then, on the basis of the data transferred to the hold memory, the driving video signals are outputted to the source bus lines SL. That is, display based on the data is performed while being delayed by a time corresponding to one line with respect to the input of the data.

Figure 12:
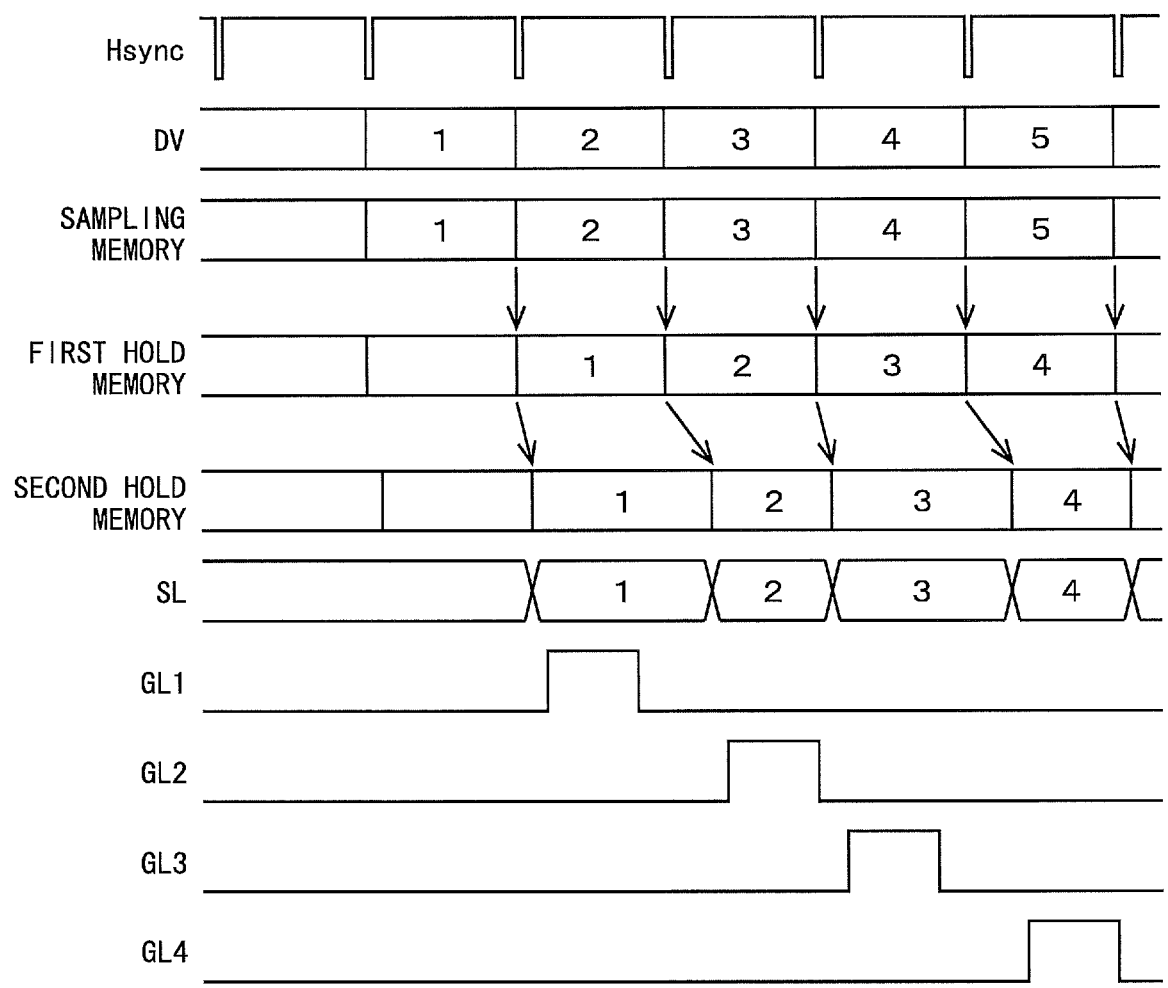
FIG. 12 is a diagram for explaining a flow of data (data for displaying an image) in the first embodiment.

FIG. 12 is a diagram for explaining the flow of the data in this embodiment. The data (digital video signal DV) of each row, which is sent to the source driver 112, is captured into the sampling memory on the basis of the sampling pulse. After the data for one line is captured into the sampling memory, the data held in the sampling memory is simultaneously transferred to the first hold memory. After the data is transferred to the first hold memory, the data is transferred to the second hold memory while being delayed by a predetermined time (a delay time differs between data of odd-numbered row and data of even-numbered row). Then, on the basis of the data transferred to the second hold memory, the driving video signals are outputted to the source bus lines SL. In this manner, display based on the data is performed while being delayed by a time longer than the time corresponding to one line with respect to the input of the data.

Figure 13:
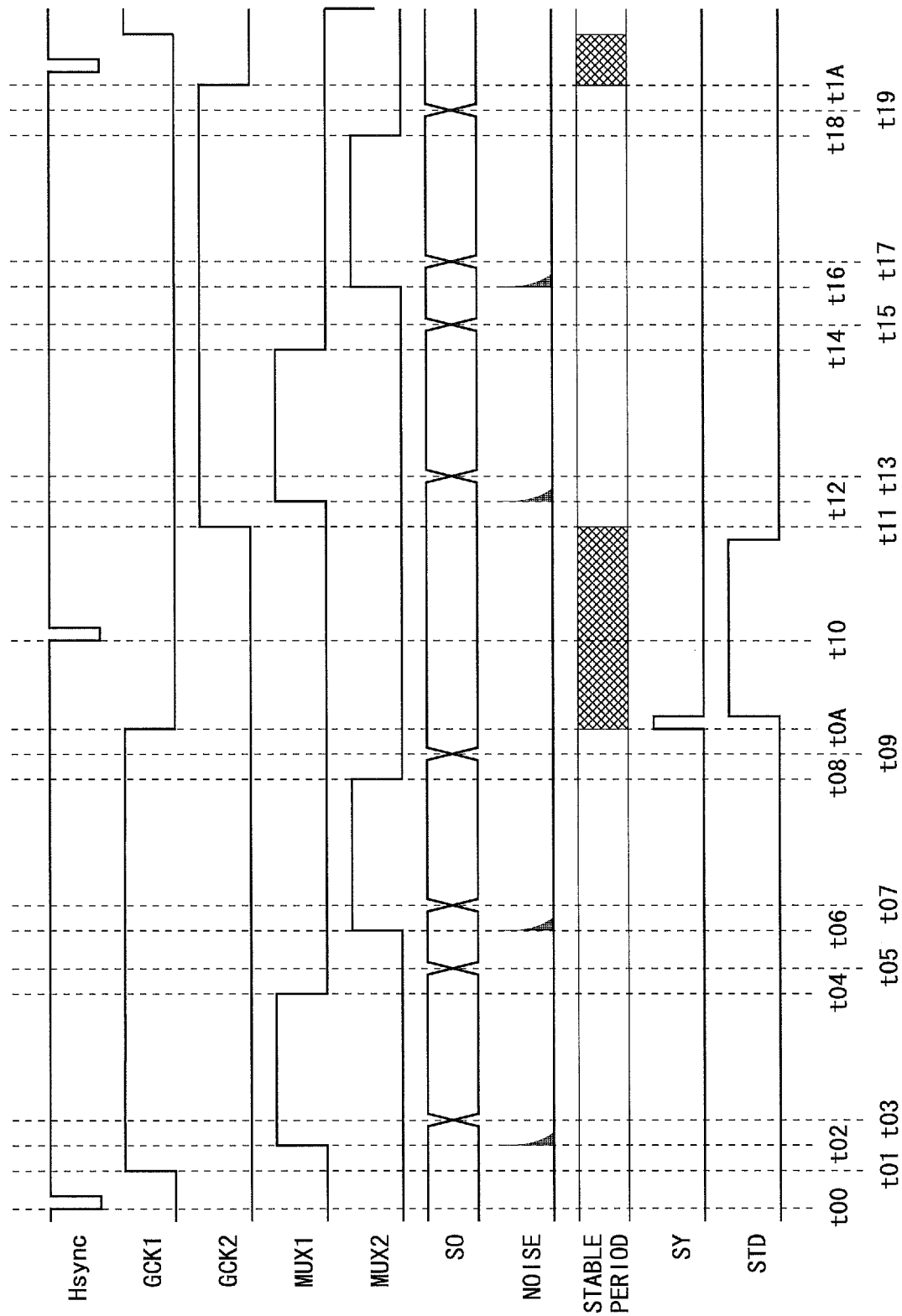
FIG. 13 is a timing chart illustrating changing timing of a waveform of each signal in detail in the first embodiment.

Next, with reference to FIG. 13 to FIG. 15, a description will be given of how to differentiate the changing timing of the waveform of each signal between the odd-numbered horizontal scanning period Ho and the even-numbered horizontal scanning period He. FIG. 13 is a timing chart illustrating the changing timing of the waveform of each signal in detail. Note that, regarding FIG. 13, a waveform denoted by reference symbol SO is a waveform of the driving video signal outputted from the output circuit 64 (see FIG. 5 and FIG. 6) in the source driver 112.

In this embodiment, information for determining the changing timing of each waveform of the first gate clock signal GCK1, the second gate clock signal GCK2, the first time division control signal MUX1, the second time division control signal MUX2, the driving video signal SO and the like is held as the timing setting information TSD in the register 106 in the display controller 100. FIG. 14 is a diagram illustrating an example of the timing setting information TSD. In this embodiment, there are provided: a "register setting group A" that is an information group for determining the changing timing of the waveform of each signal in the odd-numbered horizontal scanning periods Ho; and a "register setting group B" that is an information group for determining the changing timing of each signal in the even-numbered horizontal scanning periods He. Note that another register setting group may be provided in addition to the register setting group A and the register setting group B.

Incidentally, in this embodiment, in both of the odd-numbered frame periods and the even-numbered frame periods, the changing timing of the waveform of each signal is determined on the basis of information on the register setting group A in the odd-numbered horizontal scanning periods Ho, and the changing timing of the waveform of each signal is determined on the basis of information on the register setting group B in the even-numbered horizontal scanning periods He. Information regarding this (hereinafter, referred to as "reference register information") is also held in the register 106. In this embodiment, such reference register information as illustrated in FIG. 15 is held in the register 106. For example, a column denoted by reference numeral 82 in FIG. 15 means: "In the odd-numbered horizontal scanning periods Ho (horizontal scanning periods for driving odd-numbered lines) in the even-numbered frame periods, the changing timing of the waveform of each signal is determined on the basis of the information on the register setting group A".

Here, respective items illustrated in FIG. 14 (that is, respective items held as the timing setting information TSD in the register 106) will be described (see also FIG. 13). Information defined as "START" of "GCK" is information indicating a length of a period from the starting point of time of the horizontal scanning period to the rising point of time of the gate clock signal (first gate clock signal GCK1, second gate clock signal GCK2). Regarding this, for the register setting group A, information indicating a length of a period from a time point t00 to a time point t01 is held, and for the register setting group B, information indicating a length of a period from a time point t10 to a time point t11 is held. Information defined as "WIDTH" of "GCK" is information indicating a length of a period from the rising point of time of the gate clock signal to the falling point of time thereof. Regarding this, for the register setting group A, information indicating a length of a period from the time point t01 to a time point t0A is held, and for the register setting group B, information indicating a length of a period from the time point t11 to a time point t1A is held.

Information defined as "START" of "MUX" is information indicating a length of a period from the starting point of time of the horizontal scanning period to a rising point of time of the first time division control signal MUX1. Regarding this, for the register setting group A, information indicating a length of a period from the time point t00 to a time point t02 is held, and for the register setting group B, information indicating a length of a period from the time point t10 to a time point t12 is held. Information defined as "WIDTH" of "MUX" is information indicating a length of a period from a rising point of time of the time division control signal (first time division control signal MUX1, second time division control signal MUX2) to a falling point of time thereof. Regarding this, for the register setting group A, information indicating a length of a period from the time point t02 to a time point t04 (the length being the same as a length of a period from a time point t06 to a time point t08) is held, and for the register setting group B, information indicating a length of a period from a time point t12 to a time point t14 (the length being the same as a length of a period from a time point t16 to a time point t18) is held. Information defined as "INTARVAL" of "MUX" is information indicating a length of a period from a falling point of time of the first time division control signal MUX1 to a rising point of time of the second time division control signal MUX2. Regarding this, for the register setting group A, information indicating a length of a period from the time point t04 to the time point t06 is held, and for the register setting group B, information indicating a length of a period from the time point t14 to the time point t16 is held.

Information defined as "ChangingPoint1" of "Source" is information indicating a length of a period from a rising point of time of the first time division control signal MUX1 to a point of time of changing a level of the driving video signal. Regarding this, for the register setting group A, information indicating a length of a period from the time point t02 to a time point t03 is held, and for the register setting group B, information indicating a length of a period from the time point t12 to a time point t13 is held. Information defined as "ChangingPoint2" of "Source" is information indicating a length of a period from a falling point of time of the first time division control signal MUX1 to the point of time of changing the level of the driving video signal. Regarding this, for the register setting group A, information indicating a length of a period from the time point t04 to a time point t05 is held, and for the register setting group B, information indicating a length of a period from the time point t14 to a time point t15 is held. Information defined as "ChangingPoint3" of "Source" is information indicating a length of a period from the rising point of time of the second time division control signal MUX2 to the point of time of changing the level of the driving video signal. Regarding this, for the register setting group A, information indicating a length of a period from the time point t06 to a time point t07 is held, and for the register setting group B, information indicating a length of a period from the time point t16 to a time point t17 is held. Information defined as "ChangingPoint4" of "Source" is information indicating a length of a period from the falling point of time of the second time division control signal MUX2 to the point of time of changing the level of the driving video signal. Regarding this, for the register setting group A, information indicating a length of a period from the time point t08 to a time point t09 is held, and for the register setting group B, information indicating a length of a period from the time point t18 to a time point t19 is held.

Information defined as "Level1" of "Source" is information indicating a level of the driving video signal (outputted from the output circuit 64) after the end of the application of the driving video signal to the odd-numbered source bus line SL. Information defined as "Level1" of "Source" is information indicating a level of the driving video signal (outputted from the output circuit 64) after the end of the application of the driving video signal to the even-numbered source bus line SL. These pieces of information are set, for example, as "maintain output immediately before", "high impedance", "black level", "white level" and the like. Note that a purpose of changing the level of the driving video signal as described above after the end of the application of the driving video signal to the source bus line SL is, for example, to reduce current consumption caused by the output of the driving video signal from the output circuit 64 and to reduce noise that occurs on the surface of the liquid crystal panel 12. However, the present invention can also be applied to a case in which the level of the driving video signal is not changed after the end of the application of the driving video signal to the source bus line SL. Note that the timing generation circuit 104 (see FIG. 7) generates the source output control signal SCTL on the basis of the information defined as "Level1" and "Level2" of "Source", and outputs the generated source output control signal SCTL to the source driver 112. Then, in the source driver 112, a voltage (level of the driving video signal) outputted from the output circuit 64 to the output signal line OL changes depending on the source output control signal SCTL.

Incidentally, a reason why a level of the driving video signal SO is maintained as it is for a predetermined period after the fall of the time division control signal (first time division control signal MUX1, second time division control signal MUX2) outputted from the timing generation circuit 104 in the display controller 100 is that a delay of the time division control signal occurs in the liquid crystal panel 12 and a charging rate in the source bus line SL or the pixel capacitance 46 changes from a desired value if the level of the driving video signal SO is changed before the delay of the time division control signal converges.

Information defined as "ChangingPoint" of "COM" is information indicating a length of a period from the starting point of time of the horizontal scanning period to a point of time of reversing the polarity of the voltage VC applied to the common electrode 44. This information is also held for each of the register setting group A and the register setting group B. Note that, in FIG. 13, the illustration of the waveform of the voltage VC is omitted. Incidentally, noise is prone to occur at rising timing and falling timing of the voltage VC. Hence, it is preferable to determine the period of detecting the touch position in consideration of this point.

The information defined as each of "START" of "GCK", "WIDTH" of "GCK", "START" of "MUX", "WIDTH" of "MUX", "INTARVAL" of "MUX", "ChangingPoint1" of "Source", "ChangingPoint2" of "Source", "ChangingPoint3" of "Source", "ChangingPoint4" of "Source", and "ChangingPoint" of "COM" is set, for example, by using the number of clocks of a reference clock. For example, regarding the information defined as "START" of "GCK", "1 clock" is set for the register setting group A, and "10 clocks" is set for the register setting group B. In this case, in each of the odd-numbered horizontal scanning periods Ho, the first gate clock signal GCK1 rises after 1 clock regarding the reference clock is generated from the starting point of time of the horizontal scanning period, and in each of the even-numbered horizontal scanning period He, the first gate clock signal GCK1 rises after 10 clocks regarding the reference clock are generated from the starting point of time of the horizontal scanning period.

Note that, as the reference clock, for example, there can be used: one obtained by performing frequency division on an output (oscillation source clock) of an internal oscillation circuit; one obtained by performing frequency division on a clock directly inputted from the outside; one obtained by performing frequency division on a clock inputted as image data from the outside; and the like.

In this embodiment, the above-mentioned respective items as the timing setting information TSD are set to values different between the register setting group A and the register setting group B so that the display driving operation is performed after the lapse of a relatively short time from the starting point of time of the horizontal scanning period in the odd-numbered horizontal scanning period Ho, and that the display driving operation is performed after the lapse of a relatively long time from the starting point of time of the horizontal scanning period in the even-numbered horizontal scanning period He. The timing generation circuit 104 generates the variety of timing signals with reference to the timing setting information TSD thus set, and accordingly, the waveforms of the variety of timing signals change at timing different between the odd-numbered horizontal scanning periods Ho and the even-numbered horizontal scanning periods He.

<1.5 Effect>

Figure 16:
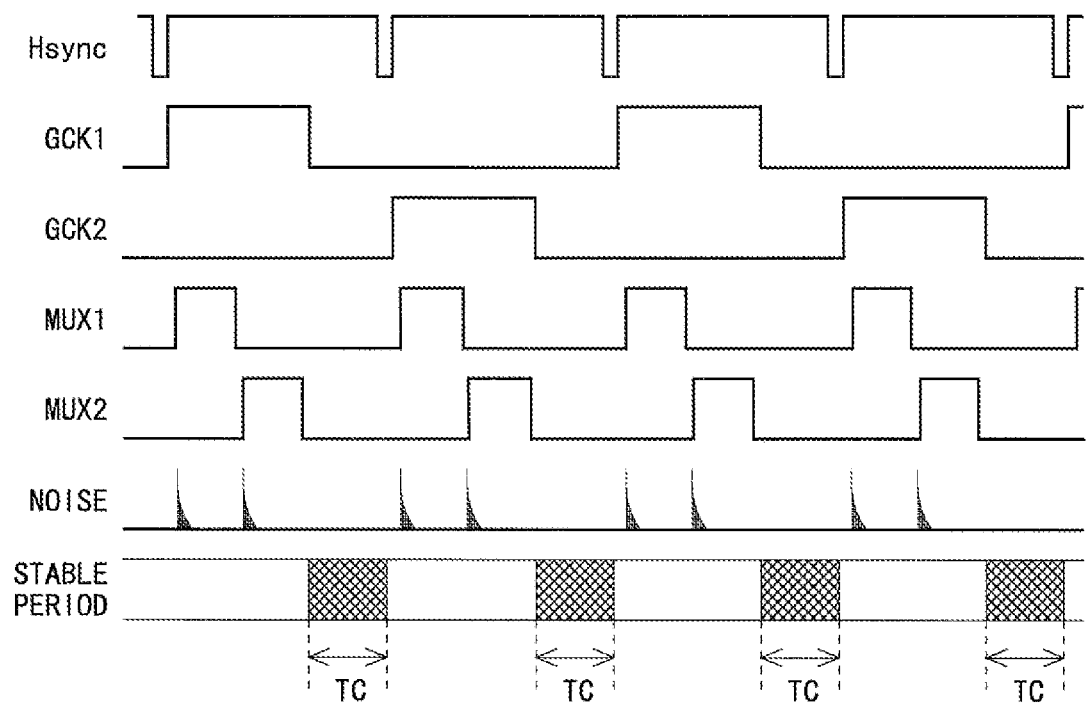
FIG. 16 is a timing chart illustrating a method for driving a conventional display device with a touch sensor.

Hereinafter, effects in this embodiment will be described. In the conventional display device with a touch sensor, which adopts the time division driving (where the number of time divisions is two), as illustrated in FIG. 16, in all the horizontal scanning periods, the gate clock signal (first gate clock signal GCK1 or second gate clock signal GCK2) rises after the lapse of the same period from the starting point of time of each horizontal scanning period. Therefore, stable periods with a fixed length TC occur near the end of the respective horizontal scanning periods. In contrast, according to this embodiment, as illustrated in FIG. 1, in each of the odd-numbered horizontal scanning periods Ho, the gate clock signal rises after the lapse of a relatively short time from the starting point of time of the horizontal scanning period, and in each of the even-numbered horizontal scanning periods He, the gate clock signal rises after the lapse of a relatively long time from the starting point of time of the horizontal scanning period. Therefore, stable periods with a relatively long length TS occur every two horizontal scanning periods. Since the long stable periods are ensured in this manner, even when the length of one horizontal scanning period is shortened as a result of advancements of a resolution increase and a frame rate increase (for example, frame rate increased to 90 Hz or 120 Hz), it is possible to detect the touch position without being affected by noise. That is, the S/N ratio is increased more than heretofore, and the touch performance (detection performance for the touch position) is improved. Note that, while the touch position is detected every two horizontal scanning periods, sufficient touch performance is obtained particularly in a case where the resolution increase and the frame rate increase are advanced.

Incidentally, in a case where the RAM-less display controller is used, in general, it becomes possible to ensure a driving period with a length enough to detect the touch position by providing a line buffer for several tens of lines to several hundred lines. In this point, according to this embodiment, just by adding the memory (hold memory) for one line to the conventional configuration, it becomes possible to ensure the driving periods with a length enough to detect the touch position every two horizontal scanning periods. As a result, it is possible to reduce current consumption and to miniaturize a chip size in comparison with the conventional case.

From the above, according to this embodiment, a display device with a touch sensor, which is capable of accurately detecting the touch position while reducing the current consumption more than heretofore, is achieved. Moreover, just by adding the memory (hold memory) for one line to the conventional configuration, it is possible to cause the timing of starting the display driving operation to differ between the odd-numbered horizontal scanning periods Ho and the even-numbered horizontal scanning periods He so that the driving periods with a length enough to detect the touch position are ensured. That is, a display device with a touch sensor, which is capable of accurately detecting the touch position even when a smaller storage area than heretofore is used, is achieved.

<1.6 Modification>

A modification of the first embodiment will be described.

<1.6.1 Regarding Touch Drive Signal>

Figure 17:
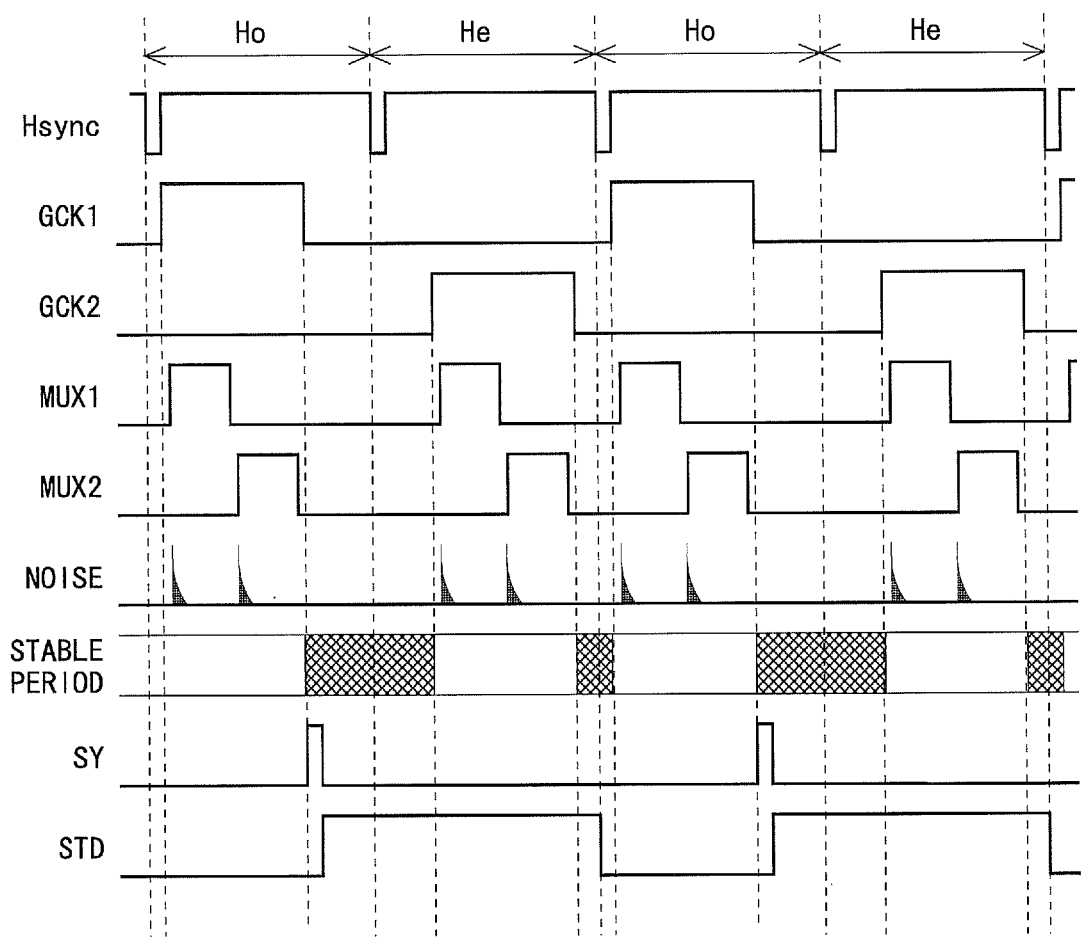
FIG. 17 is a timing chart for explaining changing timing of a waveform of a touch drive signal according to a modification of the first embodiment.
Figure 18:
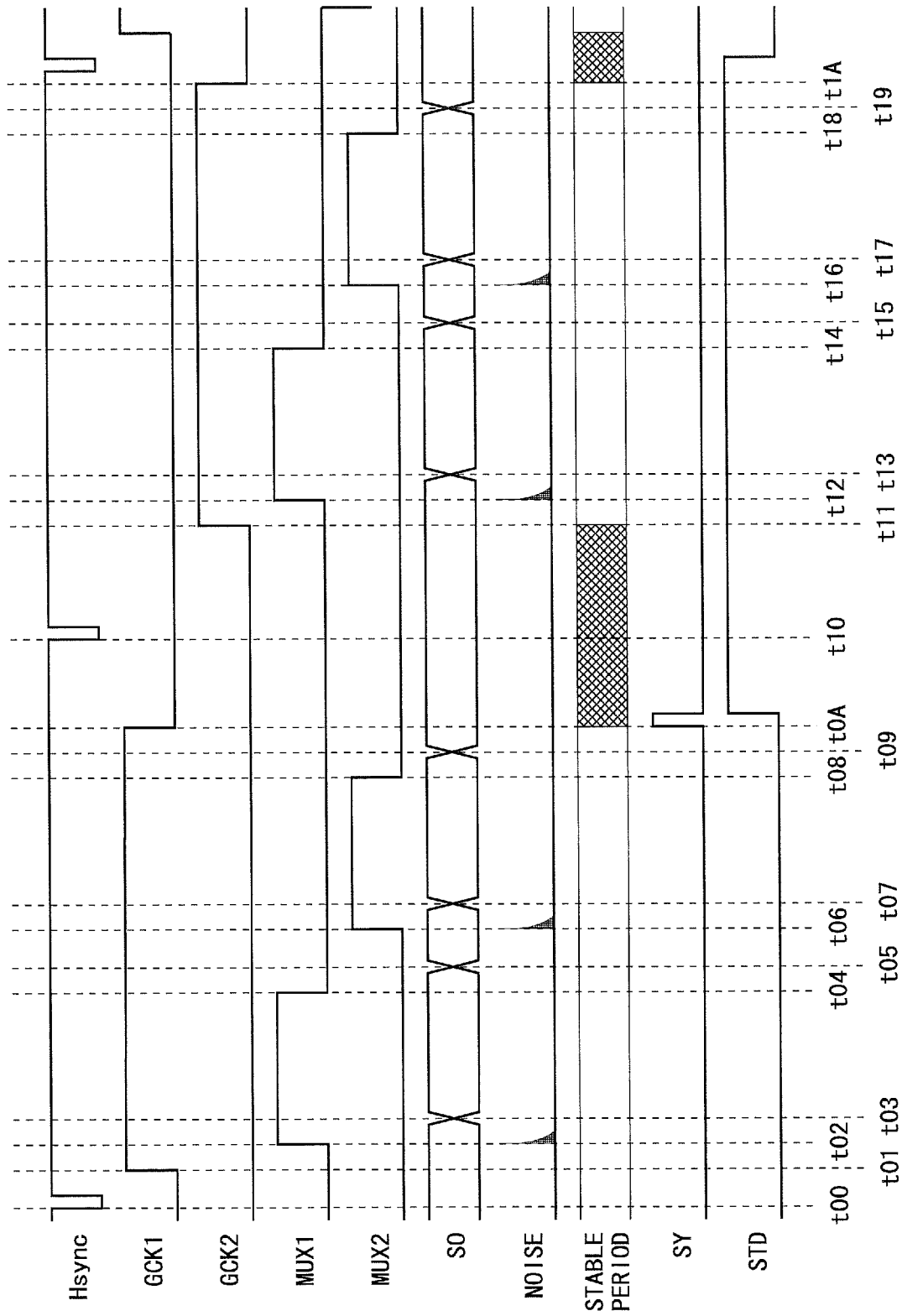
FIG. 18 is a timing chart for explaining the changing timing of the waveform of the touch drive signal according to the modification of the first embodiment.

In the above-described first embodiment, as illustrated in FIG. 1, the touch drive signal STD rises after the end of the effective horizontal scanning period in each of the odd-numbered horizontal scanning periods Ho, and falls immediately before the start of the effective horizontal scanning period in each of the even-numbered horizontal scanning periods He. However, the present invention is not limited to this. Specific rising point of time and falling point of time of the touch drive signal STD are not limited as long as noise is small at the rising point of time of the touch drive signal STD and noise is small near the point immediately before the falling point of time of the touch drive signal STD. For example, as illustrated in FIG. 17 and FIG. 18, the touch drive signal STD may be fallen in the stable period after the end of the effective horizontal scanning period in the even-numbered horizontal scanning period He.

Figure 19:
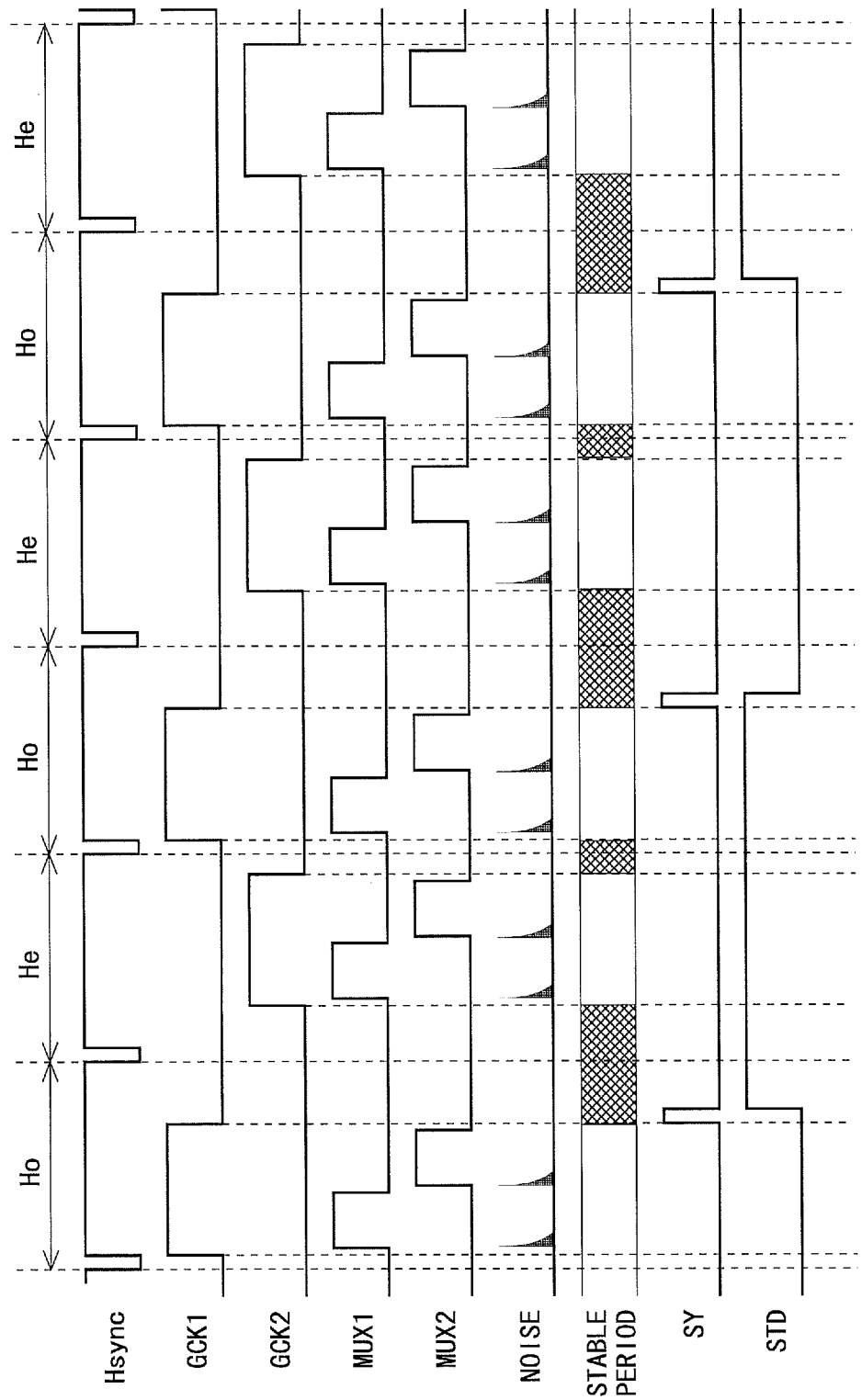
FIG. 19 is a timing chart for explaining the changing timing of the waveform of the touch drive signal according to the modification of the first embodiment.

Moreover, as illustrated in FIG. 19, the configuration may be such that the touch drive signal STD is raised in a stable period after an end of an effective horizontal scanning period in a certain odd-numbered horizontal scanning period Ho, and thereafter, the touch drive signal STD is fallen in a stable period after an end of an effective horizontal scanning period in a next odd-numbered horizontal scanning period Ho. In other words, The configuration may be such that, after the drive of the touch panel 220 is started, the drive of the touch panel 220 is stopped in a point of time from the ending point of time of the display driving operation by the display drive unit 110 in the next odd-numbered horizontal scanning period Ho to the starting point of time of the display driving operation by the display drive unit 110 in the subsequent even-numbered horizontal scanning period He. As a result, the rise/fall of the touch drive signal STD are not performed in a short stable period, and accordingly, both of the start and stop of the drive of the touch panel 220 can be surely performed in the stable period with small noise. Note that, according to this driving method, a duty ratio of the touch drive signal STD is substantially 50 percent.

<1.6.2 Regarding Touch Sensor>

In the above-described first embodiment, the on-cell-type touch panel is adopted. However, the present invention is not limited to this. An out-cell-type touch panel and an in-cell-type touch panel can also be adopted. Moreover, in the above-described first embodiment, the self-capacitance system is adopted as a system of position detection. However, the present invention is not limited to this. A mutual-capacitance system can also be adopted as the system of the position detection.

Moreover, the present invention can also be applied to a display device other than the display device with a touch panel, as long as the display device is provided with a sensor inside or outside a display panel and performs a display operation on the basis of information obtained by driving the sensor (particularly, in a case where the drive of the sensor and the drive for display interfere with each other). For example, the present invention can also be applied to a case where the display device is a display device with optical sensors (a display device which has a display panel provided with a plurality of optical sensors and detects a touch position on the basis of coordinates of a portion shielded from light by touch operation). Also in the display device with an optical sensor, it is preferable to perform the sensing operation and the analog-to-digital conversion for data obtained thereby in a stable period with small noise.

<1.6.3 How to Hold Timing Setting Information and Reference Register Information>

In the above-described first embodiment, the timing setting information TSD is held in the register 106 in the display controller 100. However, the present invention is not limited to this. For example, the configuration may be such that the timing setting information TSD is stored in advance in a non-volatile memory in the display controller 100, and at a startup time, the timing setting information TSD is read out from the non-volatile memory and is loaded on the register 106. Moreover, the configuration may be such that, every time when the devices starts up, the timing setting information TSD transmitted from the host 30 is loaded on the register 106. Moreover, the configuration may be such that the timing setting information TSD is stored in advance in an external device such as an EEPROM, and the display controller 100 reads out the timing setting information TSD from the external device and loads the read timing setting information TSD on the register 106. Note that the same also applies to the reference register information. As described above how to hold the timing setting information TSD and the reference register information is not particularly limited.

Moreover, although the variety of timing signals are generated on the basis of the register setting group A and the register setting group B in the above-described first embodiment, the present invention is not limited to this. The variety of timing signals may be generated on the basis of the register setting group A and shift amounts (each of the shift amounts is typically represented by the number of clocks) from values designated by the register setting group A. In this case, since only information on the shift amounts just needs to be held in the register 106 as information corresponding to the information of the register setting group B, it is possible to reduce a capacity of the register 106 in comparison with the above-described first embodiment.

<1.6.4 Regarding Time Division Driving>

In the above-described first embodiment, the time division driving is adopted, in which the driving video signal outputted to one output signal line OL is applied to two source bus lines SL in the time division manner. That is, the time division driving where the number of time divisions is two is adopted. However, the present invention can be applied to a case where the number of time divisions is other than two.

Moreover, the present invention can also be applied to the case where the time division driving is not adopted. In this case, the first time division control signal MUX1, the second time division control signal MUX2 and the sampling switch circuit 113 (see FIG. 3) are unnecessary. Moreover, the information individually defined as "START", "WIDTH" and "INTARVAL" of "MUX" out of the timing setting information TSD are also unnecessary.

<1.6.5 Regarding Drive of Common Electrode>

In the above-described first embodiment, the polarity of the voltage VC applied to the common electrode 44 is reversed every horizontal scanning period. That is, the common electrode 44 is subjected to AC driving. However, the present invention is not limited to this. The present invention can also be applied to a case where a configuration in which a constant voltage VC is applied to the common electrode 44 throughout a period during which the liquid crystal display device 10 is operating is adopted. In this case, the common electrode driving signal SVC (see FIG. 3) for controlling the operation of the common electrode driver 114 and the information defined as "ChangingPoint" of "COM" out of the timing setting information TSD are unnecessary.

2. Second Embodiment

A second embodiment of the present invention will be described. Note that points other than the driving method are similar to those in the above-described first embodiment, and accordingly, a description thereof will be omitted.

<2.1 Driving Method>

In the above-described first embodiment, the changing timing of the waveform of each of the variety of timing signals in the respective frames and the respective horizontal scanning periods is determined on the basis of such information as illustrated in FIG. 15. Thereby, in both of the odd-numbered frame periods and the even-numbered frame periods, in the odd-numbered horizontal scanning period Ho, the waveforms of the variety of timing signals change so that the display driving operation is performed after the lapse of a relatively short time from the starting point of time of the horizontal scanning period, and in the even-numbered horizontal scanning period He, the waveforms of the variety of timing signals change so that the display driving operation is performed after the lapse of a relatively long time from the starting point of time of the horizontal scanning period.

In contrast, in this embodiment, the changing timing of the waveform of each of the variety of timing signals in the respective frames and the respective horizontal scanning periods is determined on the basis of such information as illustrated in FIG. 20. That is, regarding the odd-numbered frame periods, the changing timing of the waveform of each signal is determined on the basis of the information on the register setting group A in the odd-numbered horizontal scanning periods Ho (horizontal scanning periods for driving the odd-numbered lines), and the changing timing of the waveform of each signal is determined on the basis of the information on the register setting group B in the even-numbered horizontal scanning periods He (horizontal scanning periods for driving the even-numbered lines). Meanwhile, regarding the even-numbered frame periods, the changing timing of the waveform of each signal is determined on the basis of the information on the register setting group B in the odd-numbered horizontal scanning periods Ho, and the changing timing of the waveform of each signal is determined on the basis of the information on the register setting group A in the even-numbered horizontal scanning periods He. Here, the information on the register setting group A and the information on the register setting group B are set similarly to those in the above-described first embodiment. As a result, regarding the odd-numbered frame periods, in the odd-numbered horizontal scanning period Ho, the waveforms of the respective signals change so that the display driving operation is performed after the lapse of a relatively short time from the starting point of time of the horizontal scanning period, and in the even-numbered horizontal scanning period He, the waveforms of the respective signals change so that the display driving operation is performed after the lapse of a relatively long time from the starting point of time of the horizontal scanning period. Moreover, regarding the even-numbered frame periods, in the odd-numbered horizontal scanning period Ho, the waveforms of the respective signals change so that the display driving operation is performed after the lapse of a relatively long time from the starting point of time of the horizontal scanning period, and in the even-numbered horizontal scanning period He, the waveforms of the respective signals change so that the display driving operation is performed after the lapse of a relatively short time from the starting point of time of the horizontal scanning period. Then, in each of the odd-numbered frame periods, the touch position is detected in the stable period crossing from the odd-numbered horizontal scanning period Ho to the even-numbered horizontal scanning period He, and in each of the even-numbered frame periods, the touch position is detected in the stable period crossing from the even-numbered horizontal scanning period He to the odd-numbered horizontal scanning period Ho.

<2.2 Effect>

According to this embodiment, in each of the odd-numbered frame periods, the stable period crossing from the odd-numbered horizontal scanning period Ho to the even-numbered horizontal scanning period He is a relatively long period, and the touch position is detected in the stable period. Moreover, in each of the even-numbered frame periods, the stable period crossing from the even-numbered horizontal scanning period He to the odd-numbered horizontal scanning period Ho is a relatively long period, and the touch position is detected in the stable period. Thus, a deviation (deviation regarding the drive) between the frames is eliminated, and accordingly, the occurrence of the operation abnormality regarding the display and the detection of the touch position is suppressed.

Note that, when the horizontal scanning period during which the display driving operation is performed after the lapse of a relatively short time from the starting point of time of the horizontal scanning period is defined as a "first-type horizontal scanning period" and the horizontal scanning period during which the display driving operation is performed after the lapse of a relatively long time from the starting point of time of the horizontal scanning period is defined as a "second-type horizontal scanning period", the deviation (deviation regarding the drive) between the frames can be eliminated by differentiating a type of a first horizontal scanning period in the preceding frame period and a type of a first horizontal scanning period in the subsequent frame period regarding any two continuous frame periods.

<2.3 Modification>

A modification of the second embodiment will be described. In this modification, the changing timing of the waveform of each of the variety of timing signals in the respective frames and the respective horizontal scanning periods is determined on the basis of such information as illustrated in FIG. 21. In this modification, when attention is paid to four frame periods which take an N-th frame as a reference, then in the N-th frame and an (N+3)-th frame, the changing timing of the waveform of each signal in each horizontal scanning period is determined on the basis of the timing setting information TSD set in the same way, and in an (N+1)-th frame and an (N+2)-th frame, the changing timing of the waveform of each signal in each horizontal scanning period is determined on the basis of the timing setting information TSD set in the same way. Specifically, regarding the N-th frame and the (N+3)-th frame, the changing timing of the waveform of each signal is determined on the basis of the information on the register setting group A in the odd-numbered horizontal scanning periods Ho, and the changing timing of the waveform of each signal is determined on the basis of the information on the register setting group B in the even-numbered horizontal scanning periods He. Moreover, regarding the (N+1)-th frame and the (N+2)-th frame, the changing timing of the waveform of each signal is determined on the basis of the information on the register setting group B in the odd-numbered horizontal scanning periods Ho, and the changing timing of the waveform of each signal is determined on the basis of the information on the register setting group A in the even-numbered horizontal scanning periods He. Then, in each of the N-th frame and the (N+3)-th frame, the touch position is detected in the stable period crossing from the odd-numbered horizontal scanning period Ho to the even-numbered horizontal scanning period He, and in each of the (N+1)-th frame and the (N+2)-th frame, the touch position is detected in the stable period crossing from the even-numbered horizontal scanning period He to the odd-numbered horizontal scanning period Ho.

According to this modification, regarding four continuous frame periods, for both of the odd-numbered horizontal scanning periods Ho and the even-numbered horizontal scanning periods He, the number of frame periods during which the changing timing of the waveform of each signal is determined on the basis of the information on the register setting group A and the number of frame periods during which the changing timing of the waveform of each signal is determined on the basis of the information on the register setting group B are equal to each other. Hence, also in this modification, the deviation (deviation regarding the drive) between the frames is eliminated. Regarding this, taking into account the point that the voltage polarities in the source bus lines SL and the pixel capacitance 46 are reversed every frame, it is conceived as suitable that one cycle is composed of four frame periods as in this modification. From the above, the occurrence of the operation abnormality regarding the display and the detection of the touch position is suppressed.

Note that, when the horizontal scanning period during which the display driving operation is performed after the lapse of a relatively short time from the starting point of time of the horizontal scanning period is defined as a "first-type horizontal scanning period" and the horizontal scanning period during which the display driving operation is performed after the lapse of a relatively long time from the starting point of time of the horizontal scanning period is defined as a "second-type horizontal scanning period", the deviation (deviation regarding the drive) between the frames can be eliminated by equalizing the number of frame periods in which the first horizontal scanning period is the first-type horizontal scanning period and the number of frame periods in which the first horizontal scanning period is the second-type horizontal scanning period regarding N continuous frame periods (N is an even number).

3. Others

This application claims priority to Japanese Patent Application 2016-220136 entitled "Display Device with Touch Sensor and Method for Driving Same" filed on Nov. 11, 2016, and the contents of which are incorporated herein by reference.

DESCRIPTION OF REFERENCE CHARACTERS

1: DISPLAY DEVICE WITH TOUCH SENSOR
10: LIQUID CRYSTAL DISPLAY DEVICE
20: TOUCH SENSOR
30: HOST
100: DISPLAY CONTROLLER
101: INTERFACE CIRCUIT
102: DATA LATCH CIRCUIT
103: COMMAND CONTROL CIRCUIT
104: TIMING GENERATION CIRCUIT
105: ARITHMETIC OPERATION CIRCUIT
106: REGISTER
111: GATE DRIVER
112: SOURCE DRIVER

200: TOUCH PANEL CONTROLLER
220: TOUCH PANEL
SY: SYNCHRONIZATION SIGNAL
STD: TOUCH DRIVE SIGNAL

The invention claimed is:

1. A display device with a touch sensor, comprising:
a display device including a display configured to display an image, a display drive circuit configured to perform a display driving operation for displaying the image on the display by applying signals to bus lines of the display device, and a display controller configured to control timing of performing the display driving operation by the display drive circuit; and
a touch sensor including a touch panel configured to perform a position detection operation for detecting a touched position, and a touch panel controller configured to drive the touch panel so that the position detection operation is performed, wherein
the display controller controls the display drive circuit to perform the display driving operation in frame periods that each includes a plurality of synchronized horizontal scanning periods,
a starting point of time of each of the plurality of synchronized horizontal scanning periods is set by a horizontal synchronization signal,
two continuous ones of the plurality of synchronized horizontal scanning periods in each frame period include, respectively, a first-type horizontal scanning period and a second-type horizontal scanning period,
in the first-type horizontal scanning period, the display controller controls the display drive circuit to perform the display driving operation after a lapse of a first time delay from the starting point of time of the first-type horizontal scanning period,
in the second-type horizontal scanning period, the display controller controls the display drive circuit to perform the display driving operation after a lapse of a second time delay from the starting point of time of the second-type horizontal scanning period,
the second time delay is longer than the first time delay,
the touch panel controller starts to drive the touch panel after an end of the display driving operation by the display drive circuit in the first-type horizontal scanning period,
the display includes a plurality of scanning signal lines,
the display drive circuit includes a scanning signal line drive circuit configured to drive the plurality of scanning signal lines, and
the scanning signal line drive circuit turns only one of the plurality of scanning signal lines to a selected state in each of the first-type horizontal scanning period and the second-type horizontal scanning period.

2. The display device with a touch sensor according to claim 1, wherein
the display controller includes a timing signal generation circuit configured to generate a timing signal group that controls the operation of the display drive circuit, and changing timing of each waveform of the timing signal group generated by the timing signal generation circuit differs between the first-type horizontal scanning period and the second-type horizontal scanning period, the changing timing being timing when the starting point of time of the corresponding synchronized horizontal scanning period is taken as a reference.

3. The display device with a touch sensor according to claim 2, wherein
the display controller further includes a register configured to hold information for determining the changing timing of each waveform of the timing signal group, and
the timing signal generation circuit generates the timing signal group based on the information held in the register.

4. The display device with a touch sensor according to claim 2, wherein
the timing signal generation circuit generates, as a signal included in the timing signal group and for turning the one of the plurality of scanning signal lines to the selected state, a first scanning control clock signal whose waveform changes at a first timing with the starting point of time of the corresponding synchronized horizontal scanning period as a reference, and a second scanning control clock signal whose waveform changes at a second timing with the starting point of time of the corresponding synchronized horizontal scanning period as a reference,
the second timing is later than the first timing, and
the scanning signal line drive circuit turns the one of the plurality of scanning signal lines to the selected state based on the first scanning control clock signal in the first-type horizontal scanning period, and turns the one of the plurality of scanning signal lines to the selected state based on the second scanning control clock signal in the second-type horizontal scanning period.

5. The display device with a touch sensor according to claim 1, wherein the touch panel controller stops driving the touch panel by a starting point of time of a display driving operation by the display drive circuit in the second-type horizontal scanning period after starting to drive the touch panel in the first-type horizontal scanning period.

6. The display device with a touch sensor according to claim 1, wherein the touch panel controller stops driving the touch panel after an end of a display driving operation by the display drive circuit in the second-type horizontal scanning period after starting to drive the touch panel in the first-type horizontal scanning period.

7. The display device with a touch sensor according to claim 1, wherein the touch panel controller stops driving the touch panel from an ending point of time of the display driving operation by the display drive circuit in the next first-type horizontal scanning period to a starting point of time of the display driving operation by the display drive circuit in the subsequent second-type horizontal scanning period after starting to drive the touch panel.

8. The display device with a touch sensor according to claim 1, wherein
the display controller gives a synchronization signal to the touch panel controller after an end of the display driving operation by the display drive circuit in the first-type horizontal scanning period, and
the touch panel controller starts to drive the touch panel based on the synchronization signal.

9. The display device with a touch sensor according to claim 1, wherein, regarding any two continuous frame periods, a type of a first synchronized horizontal scanning period in a preceding frame period and a type of a first synchronized horizontal scanning period in a subsequent frame period differ from each other.

10. The display device with a touch sensor according to claim 1, wherein, regarding N frame periods which are continuous (N is an even number), a number of frame periods in which a first synchronized horizontal scanning period is the first-type horizontal scanning period and a number of frame periods in which a first synchronized horizontal scanning period is the second-type horizontal scanning period are equal to each other.

11. A method for driving a display device with a touch sensor, the display device with the touch sensor including: the display device including a display configured to display an image and a display drive circuit configured to perform a display driving operation for displaying the image on the display by applying signals to bus lines of the display device; and the touch sensor including a touch panel configured to perform a position detection operation for detecting a touched position, the method comprising:
- a display control step of controlling timing of performing the display driving operation by the display drive circuit in frame periods that each includes a plurality of synchronized horizontal scanning periods; and
- a touch drive step of driving the touch panel so that the position detection operation is performed, wherein
- a starting point of time of each of the plurality of synchronized horizontal scanning periods is set by a horizontal synchronization signal,
- two continuous ones of the plurality of synchronized horizontal scanning periods in each frame period include, respective, a first-type horizontal scanning period and a second-type horizontal scanning period,
- in the display control step and in the first-type horizontal scanning period, the display drive circuit is controlled to perform the display driving operation after a lapse of a first time delay from the starting point of time of the first-type horizontal scanning period,
- in the display control step and in the second-type horizontal scanning period, the display drive circuit is controlled to perform the display driving operation after a lapse of a second time delay from the starting point of time of the second-type horizontal scanning period,
- the second time delay is longer than the first time delay,
- in the touch driving step, the touch panel is started to be driven after an end of the display driving operation by the display drive circuit in the first-type horizontal scanning period,
- the display includes a plurality of scanning signal lines,
- the display drive circuit includes a scanning signal line drive circuit configured to drive the plurality of scanning signal lines, and
- the scanning signal line drive circuit turns only one of the plurality of scanning signal lines to a selected state in each of the first-type horizontal scanning period and the second-type horizontal scanning period.

\* \* \* \* \*